United States Patent
Mishra et al.

(10) Patent No.: US 11,275,703 B1
(45) Date of Patent: Mar. 15, 2022

(54) REAL-TIME CONTROL COMPLIANT RADIO FREQUENCY COEXISTENCE MANAGEMENT BUS

(71) Applicant: QUALCOMM Incorporated, San Diego, CA (US)

(72) Inventors: Lalan Jee Mishra, San Diego, CA (US); Mohit Kishore Prasad, San Diego, CA (US); Richard Dominic Wietfeldt, San Diego, CA (US); Irfan Khan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/024,258

(22) Filed: Sep. 17, 2020

(51) Int. Cl.
*G06F 13/20* (2006.01)
*G06F 13/42* (2006.01)

(52) U.S. Cl.
CPC .......... *G06F 13/20* (2013.01); *G06F 13/4291* (2013.01)

(58) Field of Classification Search
CPC ........... G06F 13/40; G06F 13/42; H04J 13/00
See application file for complete search history.

(56) References Cited

U.S. PATENT DOCUMENTS

| | | | | |
|---|---|---|---|---|
| 5,793,758 A * | 8/1998 | Penners | ................ | H04J 13/004 370/342 |
| 2010/0137025 A1 * | 6/2010 | Tal | ........................ | H04B 3/32 455/553.1 |
| 2010/0227570 A1 * | 9/2010 | Hendin | ................... | H04B 1/406 455/78 |
| 2014/0031036 A1 * | 1/2014 | Koo | ....................... | H04W 36/20 455/434 |
| 2015/0043471 A1 * | 2/2015 | Rinne | ................... | H04L 5/0053 370/329 |
| 2019/0227962 A1 | 7/2019 | O'Shea et al. | | |
| 2019/0227971 A1 * | 7/2019 | O'Shea | ............... | G06F 13/4282 |
| 2020/0081859 A1 | 3/2020 | Mishra et al. | | |
| 2020/0201808 A1 | 6/2020 | Graif et al. | | |

OTHER PUBLICATIONS

International Search Report and Written Opinion—PCT/US2021/044373—ISA/EPO—dated Dec. 3, 2021.

* cited by examiner

*Primary Examiner* — Getente A Yimer
(74) *Attorney, Agent, or Firm* — Qualcomm Incorporated

(57) ABSTRACT

Systems, methods, and apparatus for multi-drop coexistence management are described. A data communication apparatus has a bus interface that couples the data communication apparatus to a serial bus and a controller configured to determine that a datagram received from the serial bus is addressed to a register address corresponding to a coexistence management identifier, activate a line driver of the bus interface circuit that is coupled to a data line of the serial bus during a portion of a first payload of the datagram when one or more coexistence management messages are ready for sending from the slave device, where the portion of the first payload of the datagram is allocated for use of the apparatus, and transmit a first coexistence management message in the portion of the first payload of the datagram that is allocated for use of the data communication apparatus.

30 Claims, 19 Drawing Sheets

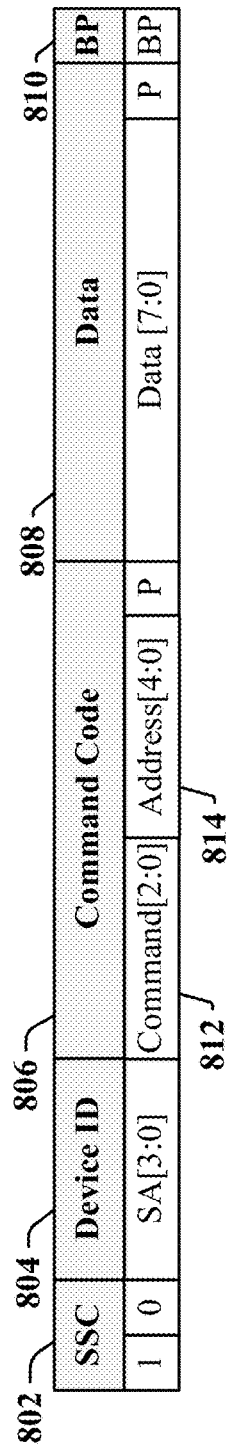
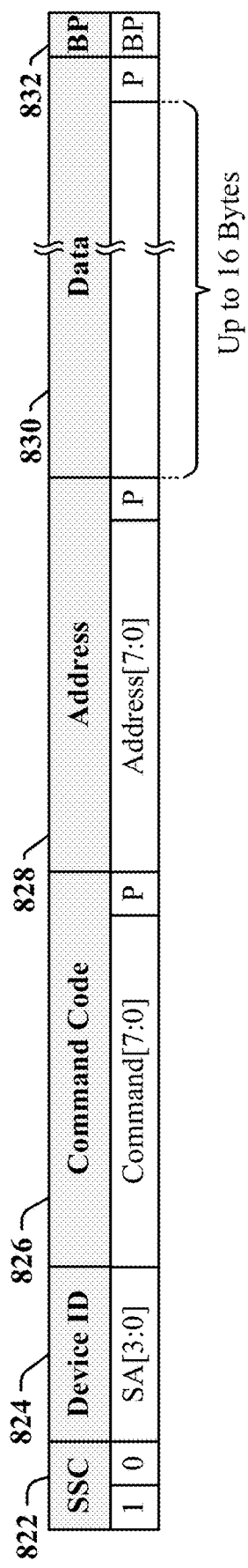
FIG. 8

REAL-TIME CONTROL COMPLIANT RADIO FREQUENCY COEXISTENCE MANAGEMENT BUS

TECHNICAL FIELD

The present disclosure relates generally to serial communication over a shared serial bus and, more particularly, to a high-speed, low-latency serial bus that can support radio frequency device coexistence operations.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus operated in accordance with an Inter-Integrated Circuit (I2C bus or I$^2$C). The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal.

A serial bus may employ a multi-master protocol in which one or more devices can serve as a master and a slave for different messages transmitted on the serial bus. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. In another example, the Radio Frequency Front-End (RFFE) interface defined by the MIPI Alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, the system power management interface (SPMI) defined by the MIPI Alliance provides a hardware interface that may be implemented between baseband or application processors and peripheral components. In some implementations, systems employ SPMI to support power management operations within a device.

In many instances, a multi-drop serial bus may be provided to support a combination of high-priority, low-latency communication and lower-priority communication. Latency can be adversely affected when multiple devices coupled to the serial bus are concurrently active and attempting to gain bus access for transmission initiation. Degraded latencies can lead to a failure to meet certain applications performance limits. As mobile communication devices employ increasing numbers of radios and continue to provide greater levels of functionality, improved serial communication techniques are needed to accommodate high-priority, low-latency functions including management functions that facilitate coexistence in a multi-radio device.

SUMMARY

Certain aspects of the disclosure relate to systems, apparatus, methods and techniques that can enable a multi-purpose, multidrop serial bus to be used as a coexistence management communication link and interface. A datagram may be adapted to use a register address that identifies the datagram as a vehicle for multidirectional coexistence messages, whereby a message may be sent from one device to one or more other devices.

In various aspects of the disclosure, a data communication method performed at a slave device coupled to a serial bus includes determining that a datagram received from a serial bus is addressed to a register address corresponding to a coexistence management identifier, activating a line driver coupled to a data line of the serial bus during a portion of a first payload of the datagram when one or more coexistence management messages are ready for sending from the slave device, where the portion of the first payload of the datagram is allocated for use of the slave device, and transmitting a first coexistence management message of the one or more coexistence management messages in the portion of the first payload of the datagram that is allocated for use of the slave device.

In various aspects of the disclosure, a data communication apparatus has a bus interface circuit configured to couple the data communication apparatus to a serial bus and a controller configured to determine that a datagram received from a serial bus is addressed to a register address corresponding to a coexistence management identifier, activate a line driver of the bus interface circuit that is coupled to a data line of the serial bus during a portion of a first payload of the datagram when one or more coexistence management messages are ready for sending from the slave device, where the portion of the first payload of the datagram being allocated for use of the data communication apparatus, and transmit a first coexistence management message of the one or more coexistence management messages in the portion of the first payload of the datagram that is allocated for use of the data communication apparatus.

In various aspects of the disclosure, a data communication apparatus has means for determining that a datagram received from a serial bus is addressed to a register address corresponding to a coexistence management identifier, means for activating a line driver coupled to a data line of the serial bus during a portion of a first payload of the datagram when one or more coexistence management messages are ready for sending from the slave device, where the portion of the first payload of the datagram is allocated for use of the slave device, and means for transmitting a first coexistence management message of the one or more coexistence management messages in the portion of the first payload of the datagram that is allocated for use of the slave device.

In various aspects of the disclosure, a processor-readable storage medium stores or maintains code for determining that a datagram received from a serial bus is addressed to a register address corresponding to a coexistence management identifier, activating a line driver coupled to a data line of the serial bus during a portion of a first payload of the datagram when one or more coexistence management messages are ready for sending from the slave device, where the portion of the first payload of the datagram is allocated for use of the slave device, and transmitting a first coexistence management message of the one or more coexistence management messages in the portion of the first payload of the datagram that is allocated for use of the slave device.

In various aspects of the disclosure, a data communication method performed at a bus master device coupled to a serial bus includes transmitting a datagram over a serial bus directed to a register address corresponding to a coexistence management identifier, causing a first line driver to weakly drive a data line of the serial bus during a portion of a first payload of the datagram allocated for use of a slave device, and receiving a first coexistence management message from the slave device in the portion of the first payload of the datagram that is allocated for use of the slave device.

In various aspects of the disclosure, a data communication apparatus has a bus interface circuit configured to couple the data communication apparatus to a serial bus and a controller configured to transmit a datagram over a serial bus directed to a register address corresponding to a coexistence management identifier, cause a first line driver to weakly drive a data line of the serial bus during a portion of a first payload of the datagram that is allocated for use of a slave device, and receive a first coexistence management message from the slave device in the portion of the first payload of the datagram that is allocated for use of the slave device.

In various aspects of the disclosure, a data communication apparatus has means for transmitting a datagram over a serial bus directed to a register address corresponding to a coexistence management identifier, means for causing a first line driver to weakly drive a data line of the serial bus during a portion of a first payload of the datagram allocated for use of a slave device, and means for receiving a first coexistence management message from the slave device in the portion of the first payload of the datagram that is allocated for use of the slave device.

In various aspects of the disclosure, a processor-readable storage medium stores or maintains code for transmitting a datagram over a serial bus directed to a register address corresponding to a coexistence management identifier, causing a first line driver to weakly drive a data line of the serial bus during a portion of a first payload of the datagram allocated for use of a slave device, and receiving a first coexistence management message from the slave device in the portion of the first payload of the datagram that is allocated for use of the slave device.

BRIEF DESCRIPTION OF THE DRAWINGS

FIG. 8 illustrates datagram structures defined by RFFE and/or SPMI protocols.

DETAILED DESCRIPTION

Figure 1:
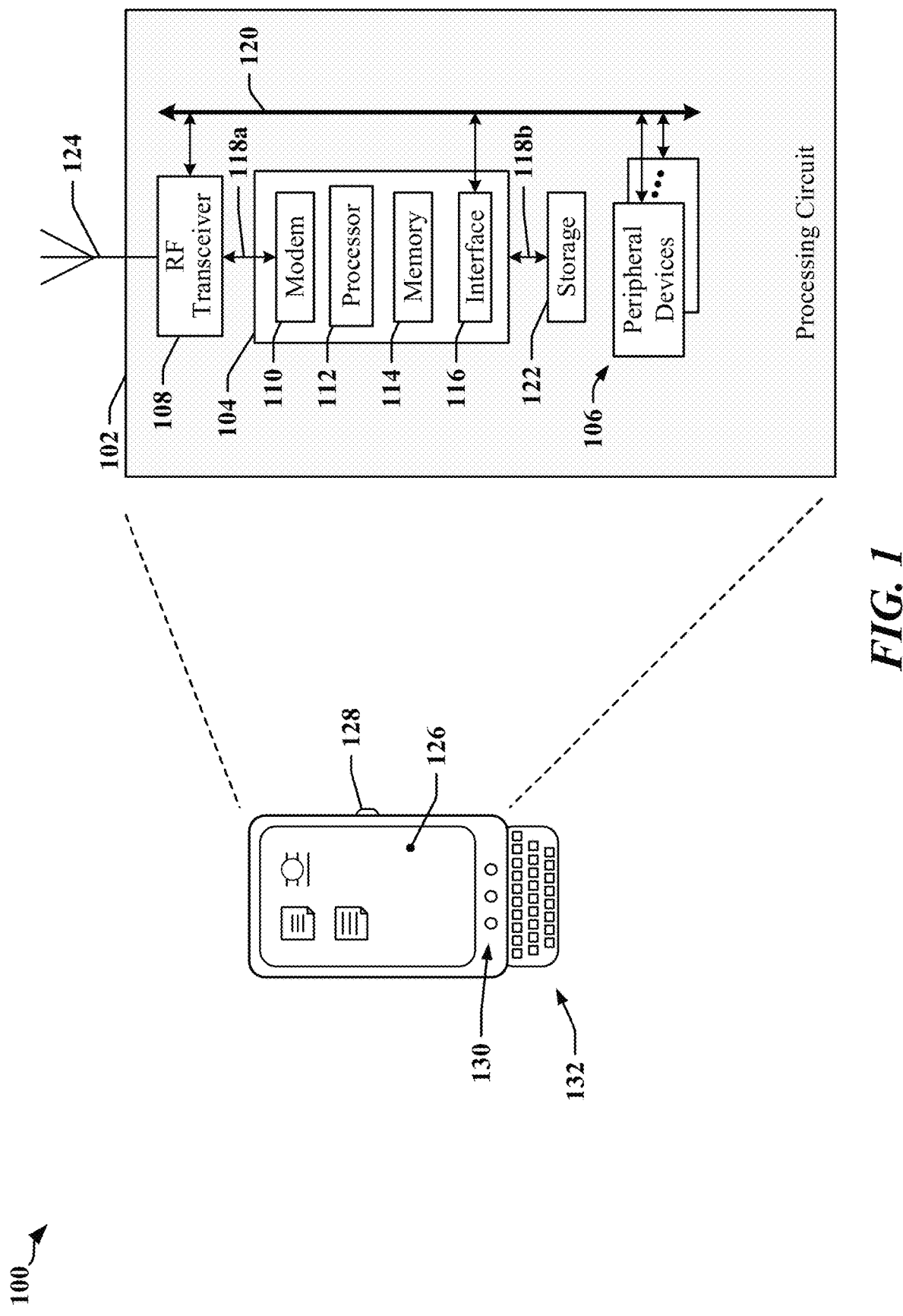
FIG. 1 illustrates an apparatus employing a data link between IC devices and that is selectively operated according to a standard or proprietary protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple devices, SoCs or other IC devices often employ a shared communication interface that may include a serial bus or other data communication link to connect processors with modems and other peripherals. The serial bus or other data communication link may be operated in accordance with standards or protocols. For example, a serial bus may be operated in accordance with an I2C, I3C, SPMI or RFFE protocol, or another protocol. The serial bus may be configured for half-duplex operation. Increased utilization of serial buses, and/or the imposition of more stringent timing constraints in support of various applications, peripherals and sensors drives demand for reduced transmission latencies. Transmission latency may include the time required to terminate a transaction in process on the serial bus, bus turnaround (between transmit mode and receive mode), bus arbitration or command transmissions specified by protocol.

High bus latency can limit the capabilities and functionality of a serial bus in certain applications. In one example, bus latency considerations may limit the number of sensors that can be coupled by an I3C, RFFE or SPMI bus. For example, certain applications specify maximum delays for reading sensor information after occurrence of an event or in response to an interrupt, and may further specify time limits in which multiple sensors are to be read. In another example, bus latency considerations may limit the number of RF devices that can be coupled by an I3C, RFFE or SPMI bus when the bus is to be used for coexistence messaging and other operations in radio frequency ICs that require very low-latency communications. For example, configuration and reconfiguration of circuits used to drive multiple antennas may generate large volumes of messages, commands and signaling directed to multiple radio frequency components. In many instances, the messages may include configuration parameters that are to be applied at a time determined by a controlling device. Congestion and increased latencies can also result from communication overhead associated with certain protocols used to control the serial bus.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax wireless local area network (WLAN) standard defined by the Institute of Electrical and Electronics Engineers (IEEE) 802.11 Working Group can require a 50% reduction in latency at conventional bus clock frequencies, increase complexity of RFFE bus architectures and increase the potential for traffic congestion on the bus. RFFE bus congestion and timing bottlenecks may be expected to exacerbate coexistence issues, for example. Increased bus activity may increase bus contention issues where RFFE bus timing is complicated. Bus contention events can increase when carrier aggregation is supported.

In many conventional systems, coexistence management (CxM) messages are exchanged between RFFE devices, modems and other devices using universal asynchronous receiver/transmitter (UART) based point-to-point communication links. The UART point-to-point approach can quickly become impractical when large numbers of devices are configured to exchange CxM messages. Certain aspects of this disclosure relate to exchanging CxM messages over a multi-drop serial, thereby reducing interconnect complexity. Latency and throughput issues are addressed through the adaptation of standards-defined protocols to enable reduce bus contention, latency and throughput issues when coexistence messages are transmitted over the serial bus.

According to certain aspects of this disclosure, a data communication method performed at a slave device coupled to a serial bus includes determining that a datagram received from a serial bus is addressed to a register address corresponding to a coexistence management identifier, activating a line driver coupled to a data line of the serial bus during a portion of a first payload of the datagram when one or more coexistence management messages are ready for sending from the slave device, where the portion of the first payload of the datagram is allocated for use of the slave device, and transmitting a first coexistence management message of the one or more coexistence management messages in the portion of the first payload of the datagram that is allocated for use of the slave device. The correspondence between a register address and a coexistence management identifier may be configured by an application, by a bus master device or may be preconfigured during initialization, or manufacture of a system.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include an SoC, or a processing circuit 102 having multiple circuits or devices 104, 106 and/or 108, which may be implemented in one or more ASICs. In one example, the apparatus 100 may operate as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 or an external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
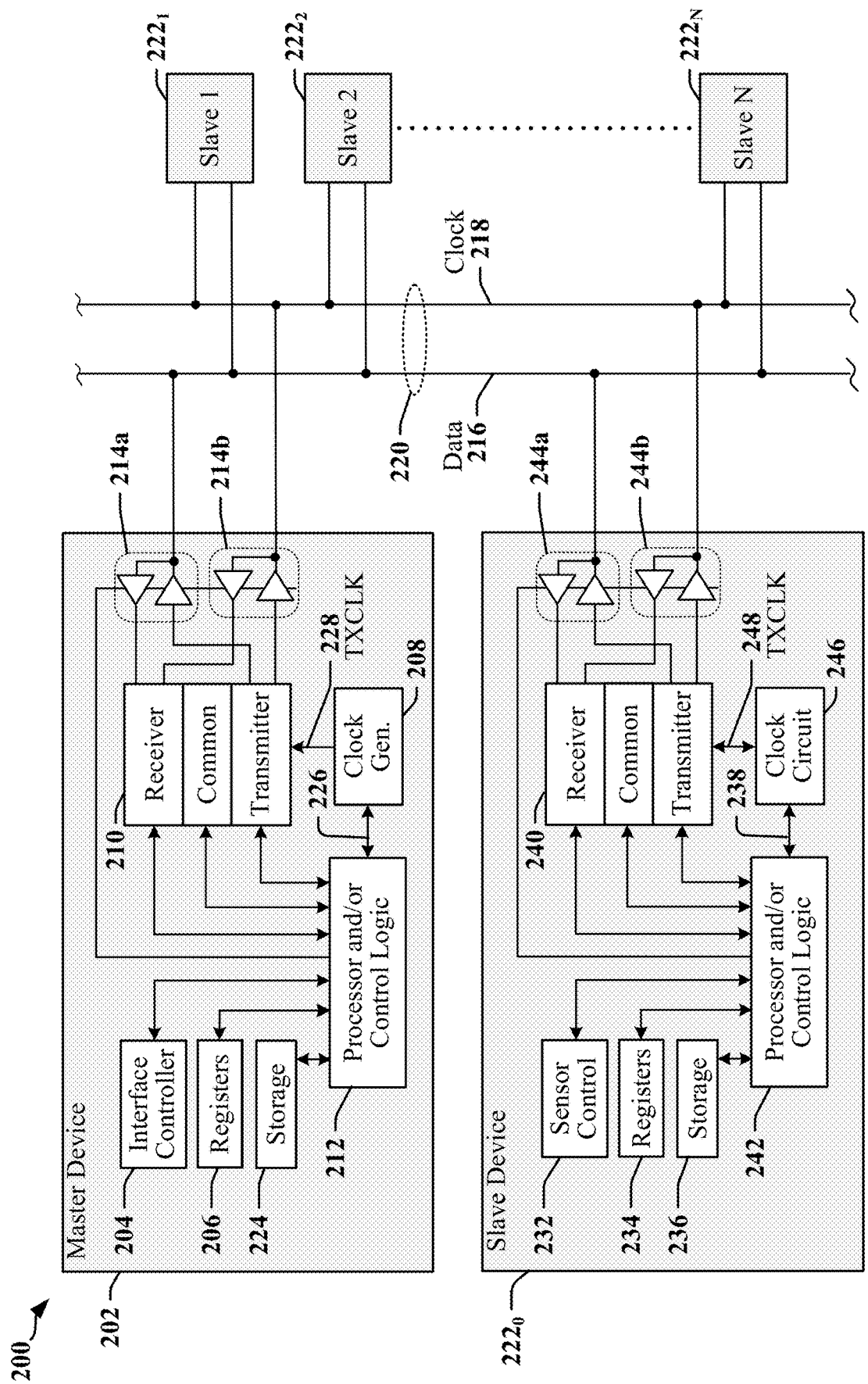
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus master devices 202.

In one example, a master device 202 may include an interface controller 204 that manages access to the serial bus, configures dynamic addresses for slave devices $222_0$-$222_N$ and/or generates a clock signal 228 to be transmitted on a clock line 218 of the serial bus 220. The master device 202 may include configuration registers 206 or other storage 224, and other control logic 212 configured to handle protocols and/or higher-level functions. The control logic 212 may include a processing circuit having a processing device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit having a processing device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C, SPMI or other protocol. In some instances, two or more devices 202, $222_0$-$222_N$ may be configured to operate as a bus master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, data is transmitted on a data line 216 of the serial bus 220 based on timing information provided in a clock signal transmitted on the clock line 218 of the serial bus 220. In some instances, data may be encoded in the signaling state, or transitions in signaling state of both the data line 216 and the clock line 218.

Figure 3:
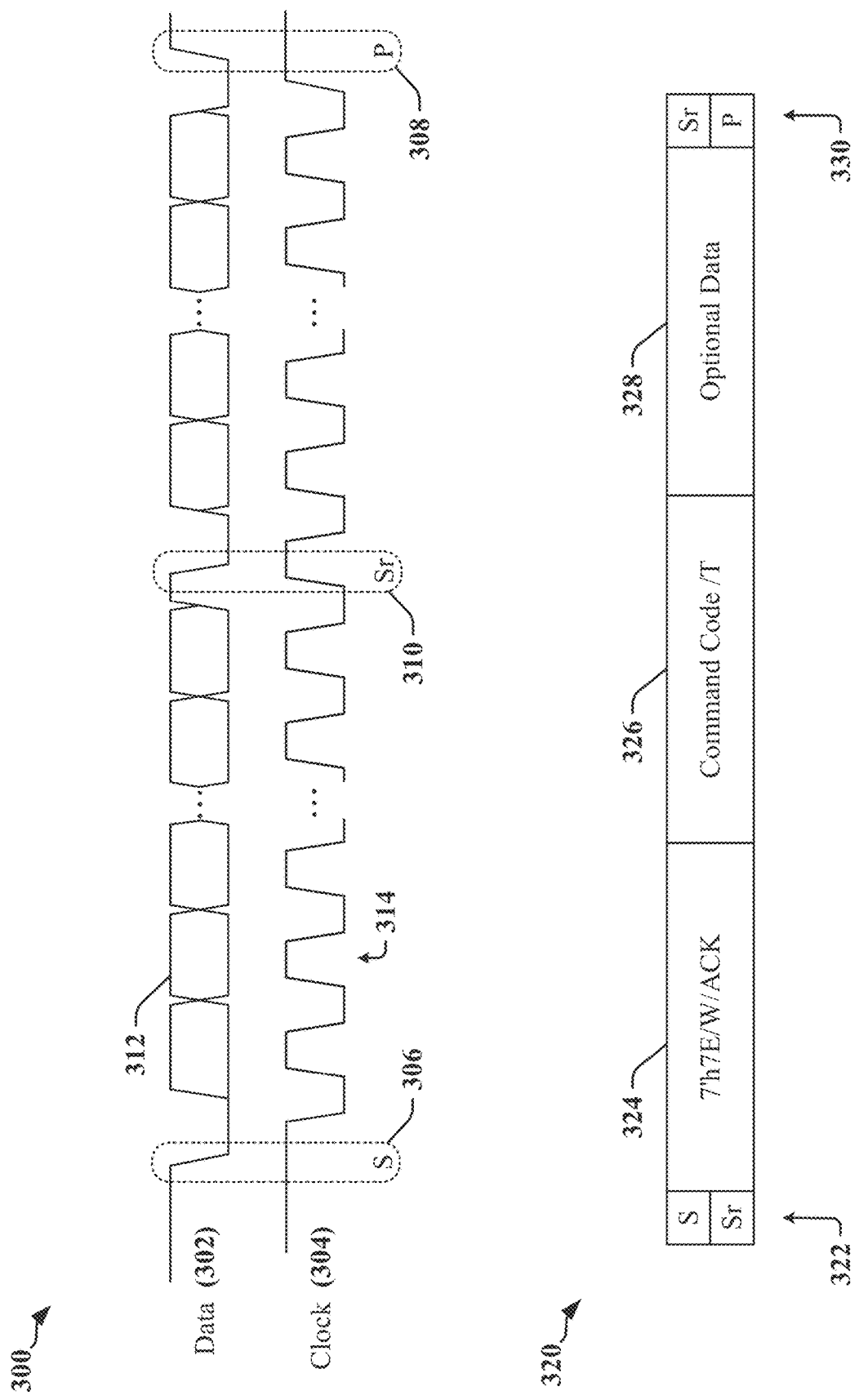
FIG. 3 includes a timing diagram that illustrates signaling on a serial bus when the serial bus is operated in a single data rate (SDR) mode of operation defined by I3C specifications.

FIG. 3 includes a timing diagram 300 that illustrates signaling on a serial bus when the serial bus is operated in a single data rate (SDR) mode of operation defined by I3C specifications. Data transmitted on a first wire (the Data wire 302) of the serial bus may be captured using a clock signal transmitted on a second wire (the Clock wire 304) of the serial bus. During data transmission, the signaling state 312 of the Data wire 302 is expected to remain constant for the duration of the pulses 314 when the Clock wire 304 is at a high voltage level. Transitions on the Data wire 302 when the Clock wire 304 is at the high voltage level indicate a START condition 306, a STOP condition 308 or a repeated START 310.

On an I3C serial bus, a START condition 306 is defined to permit the current bus master to signal that data is to be transmitted. The START condition 306 occurs when the Data wire 302 transitions from high to low while the Clock wire 304 is high. The bus master may signal completion and/or termination of a transmission using a STOP condition 308. The STOP condition 308 is indicated when the Data wire 302 transitions from low to high while the Clock wire 304 is high. A repeated START 310 may be transmitted by a bus master that wishes to initiate a second transmission upon completion of a first transmission. The repeated START 310 is transmitted instead of, and has the significance of a STOP condition 308 followed immediately by a START condition 306. The repeated START 310 occurs when the Data wire 302 transitions from high to low while the Clock wire 304 is high.

The bus master may transmit an initiator 322 such as a START condition 306 or a repeated START 310 prior to transmitting a broadcast address or unique address of a slave, a command, and/or data. FIG. 3 illustrates a command code transmission 320 by the bus master. The initiator 322 may be followed in transmission by a reserved address 324 indicating that a command code 326 is to follow. The command code 326 may, for example, cause the serial bus to transition to a desired mode of operation. Data 328 may be transmitted in some instances. The command code transmission 320 may be ended by a terminator 330 such as a STOP condition 308 or a repeated START 310.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal.

Figure 4:
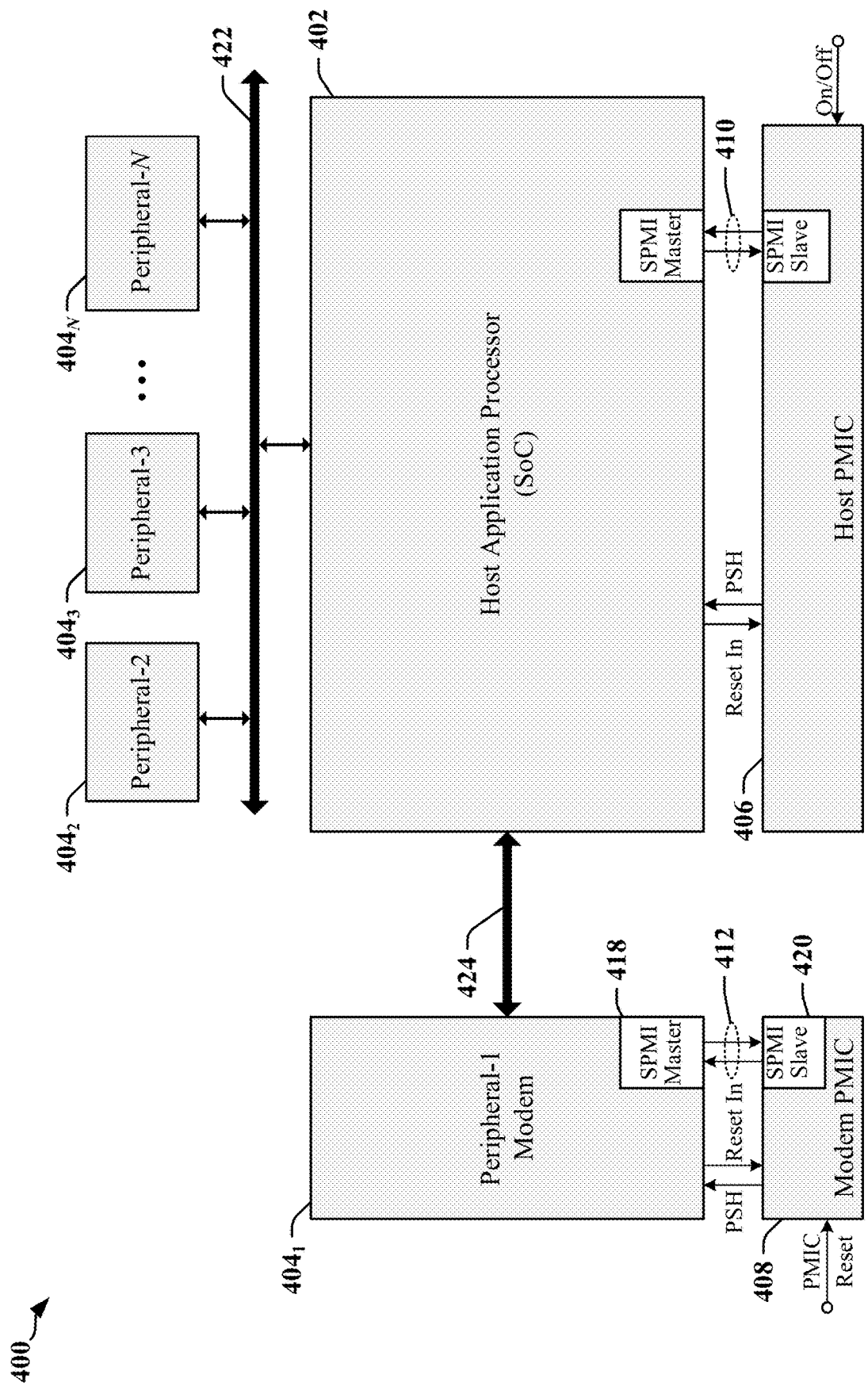
FIG. 4 illustrates a system that includes a data communication link configured as a two-wire serial bus operated in accordance with SPMI protocols.

The MIPI Alliance defines SPMI protocols and standards that specify a hardware interface to be implemented between baseband or application processors and peripheral components to support a variety of data communication functions including data communication related to power management operations. FIG. 4 illustrates an example of a system 400 which includes two data communication links 410, 412, where each data communication link 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 412, 422, 424, multiple peripherals $404_1$-$404_N$, and one or more PMICs 406. The application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 422, 424. For example, the data communication links 422, 424 may be operated in accordance with protocols such as RFFE, SPMI, I3C protocols.

Figure 5:
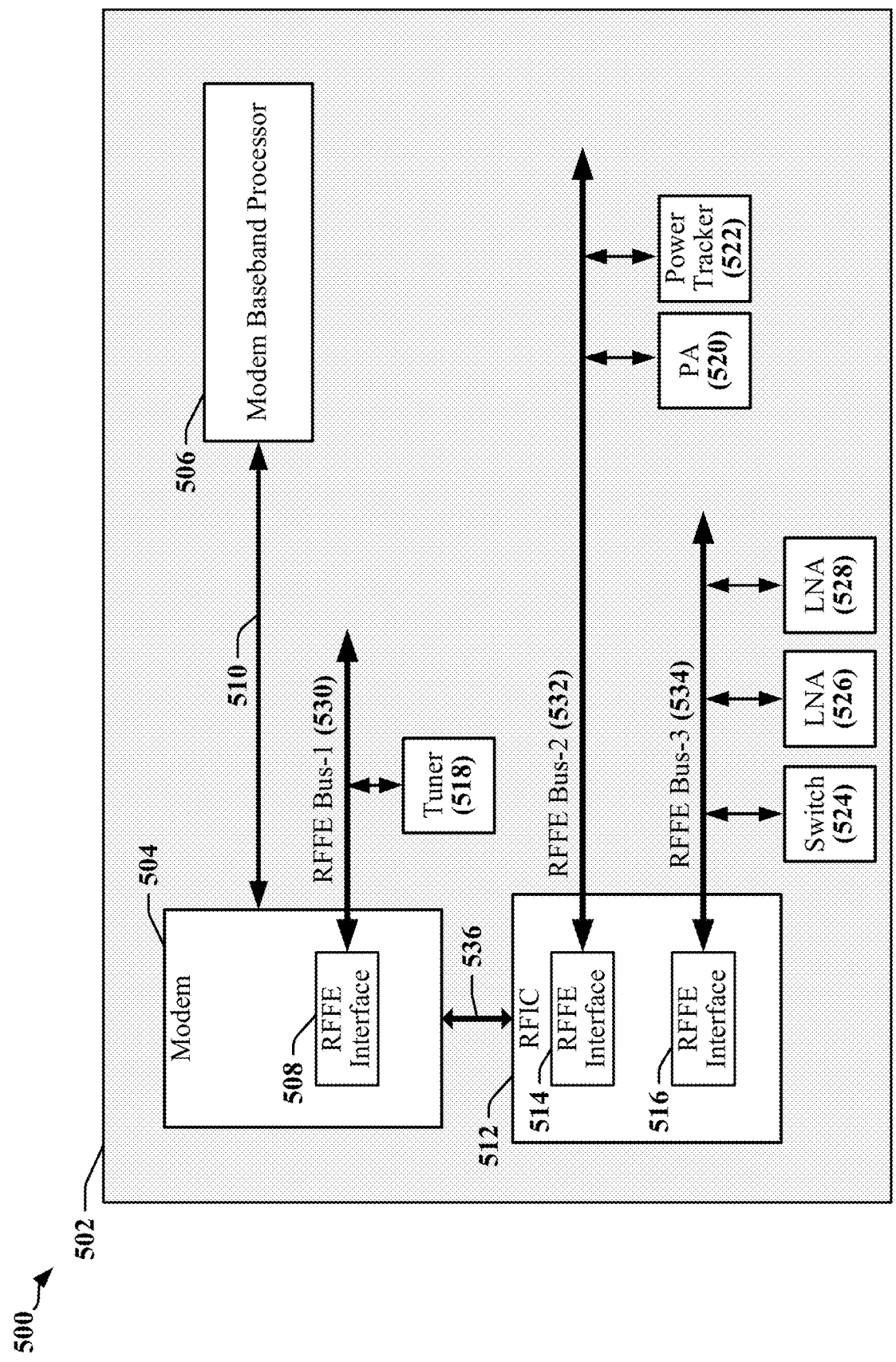
FIG. 5 illustrates a device configuration for coupling various radio frequency front-end devices using multiple RFFE buses.

FIG. 5 illustrates certain aspects of an apparatus 500 that includes multiple RFFE buses 530, 532, 534 coupled to various RF front-end devices 518, 520, 522, 524, 526, 528. A modem 502 includes an RFFE interface 508 that couples the modem 502 to a first RFFE bus 530. The modem 502 may communicate with a baseband processor 506 and a Radio-Frequency IC (RFIC 512) through one or more communication links 510, 536. The illustrated apparatus 500 may be embodied in one or more of a mobile communication device, a mobile telephone, a mobile computing system, a mobile telephone, a notebook computer, a tablet computing device, a drone, an appliance, a sensor, a media player, a gaming device, a wearable computing and/or communications device, an appliance, or the like.

In various examples, the apparatus 500 may be implemented with one or more baseband processors 506, modems 504, RFICs 512, multiple communications links 510, 536, multiple RFFE buses 530, 532, 534 and/or other types of buses. The apparatus 500 may include other processors, circuits, modules and may be configured for various operations and/or different functionalities. In the example illustrated in FIG. 5, the modem 504 is coupled to an RF tuner 518 through its RFFE interface 508 and the first RFFE bus 530. The RFIC 512 may include one or more RFFE interfaces 514, 516, controllers, state machines and/or processors that can configure and control certain aspects of the RF front-end. The RFIC 512 may communicate with a PA 520 and a power tracking module 522 through a first of its RFFE interfaces 514 and the second RFFE bus 530. The RFIC 512 may communicate with a switch 524 and one or more LNAs 526, 528.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

Bus latency, congestion and throughput issues can prevent serial buses from being in some applications. For example, CxM messages often require deterministic or low-latency transmission. Coexistence messages are transmitted in a multisystem platform to prevent or reduce instances of certain device types impinging on each other, including for example, the switches 524, LNAs 526, 528, PAs 520 and other types of device that operate concurrently in a manner that can generate inter-device interference, or that could potentially cause damage to one or more active devices through high-power electromagnetic interference. Devices that may interfere with one another may exchange coexistence management (CxM) messages to permit each device to signal imminent actions that may result in interference or conflict. CxM messages may be used to manage operation of shared components including a switch 524, LNA 526, 528, PA 520 and/or an antenna.

Figure 6:
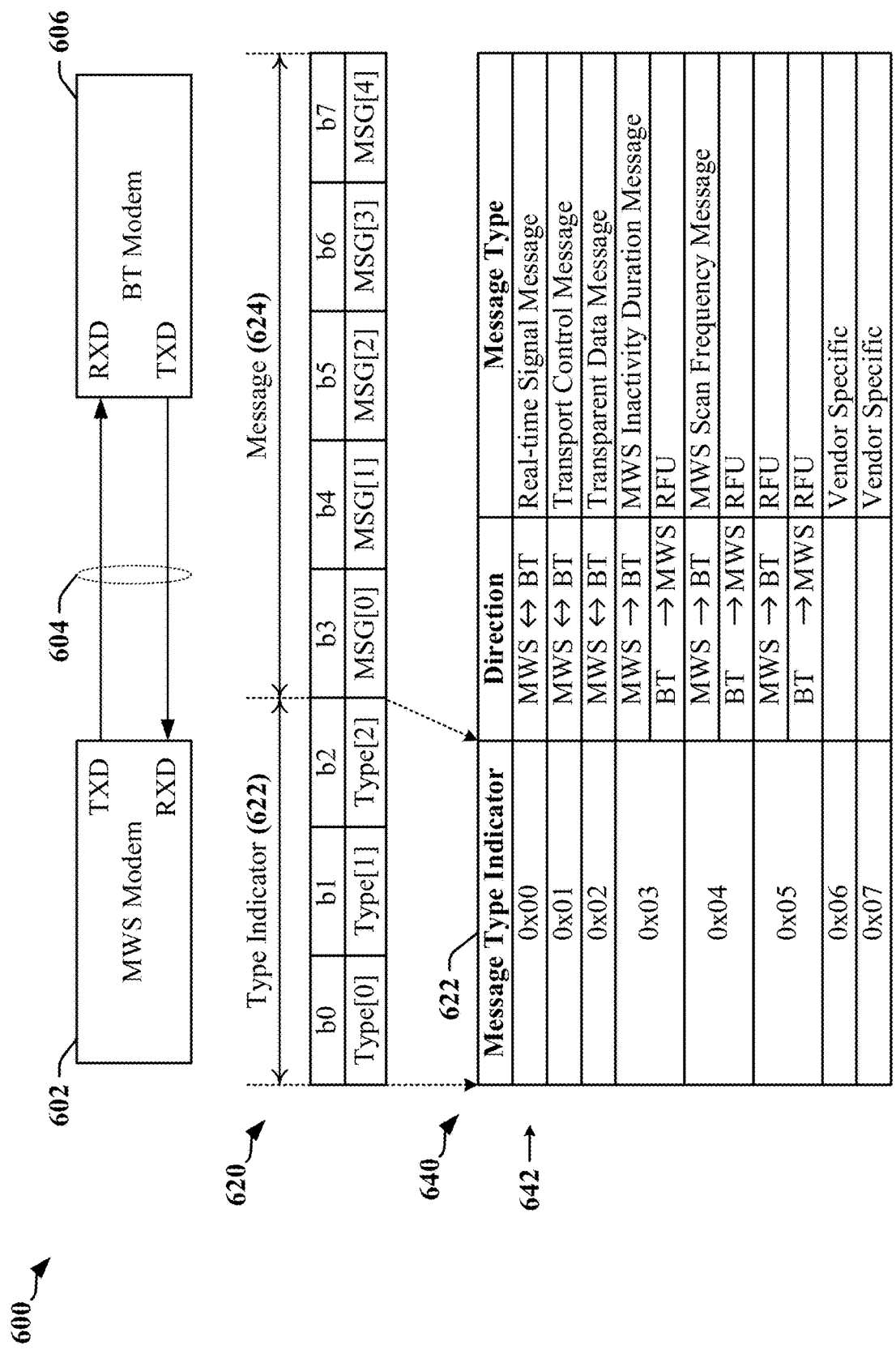
FIG. 6 illustrates an example of a coexistence management interface implementation employing a point-to-point UART-based link.

FIG. 6 illustrates an example of a conventional coexistence management interface (CxMi) 600 that employs a point-to-point UART-based link. The link may be operated at 4 Mbps. In the example, a first modem 602 is configured for operation using a mobile wireless service (MWS) radio access technology and a second modem 606 is configured for Bluetooth (BT) communications. The modems 602, 606 exchange CxM messages, commands and/or control information over a two-wire UART-based point-to-point CxMi link 604. In one example, data is clocked on the CxMi link 604 at 4 megabits per second (Mbps). Each 8-bit byte of data transferred through the CxMi link 604 is preceded by a start bit and followed by a stop bit, and transmission is accomplished in 10 clock cycles, or 2.5 µs.

FIG. 6 also includes an example of a datagram 620 for a wireless coexistence interface (WCI). In some implementations, the datagram 620 may comply or be compatible with a WCI-2 datagram that is defined for communication using a UART-based interface. The datagram includes a type indicator field 622 and a message field 624. The type indicator field 622 has a length of 3 bits that identify the content of the message field 624. The 8 message types are defined in the table 640 in FIG. 6. The Type-0 message 642 has a value of 0x00 and may carry event messages with strict latency targets. When the CxMi link 604 is operated at 4-Mbps, transmissions including a Type-0 message 642 include 1 Start bit, 8 data-bits and one Stop-bit for a total of 10 bits. Transmission time is 2.5 µs and Type-0 messages 642 are subjected to hard real-time, deterministic constraints, where transmissions are expected to be completed in less than 3 µs, for example.

Certain aspects of this disclosure provide protocols and techniques that enable CxM messaging to be supported using a multi-drop serial bus. The example of a serial bus operated in accordance with an SPMI or RFFE protocol may be used to illuminate certain concepts, but it is contemplated that other types of bus or bus protocol may be used. The presently-disclosed CxMi may be configured to at least match the performance of a UART-based point-to-point interface in which one byte may be exchanged in 2.5 µs.

Figure 7:
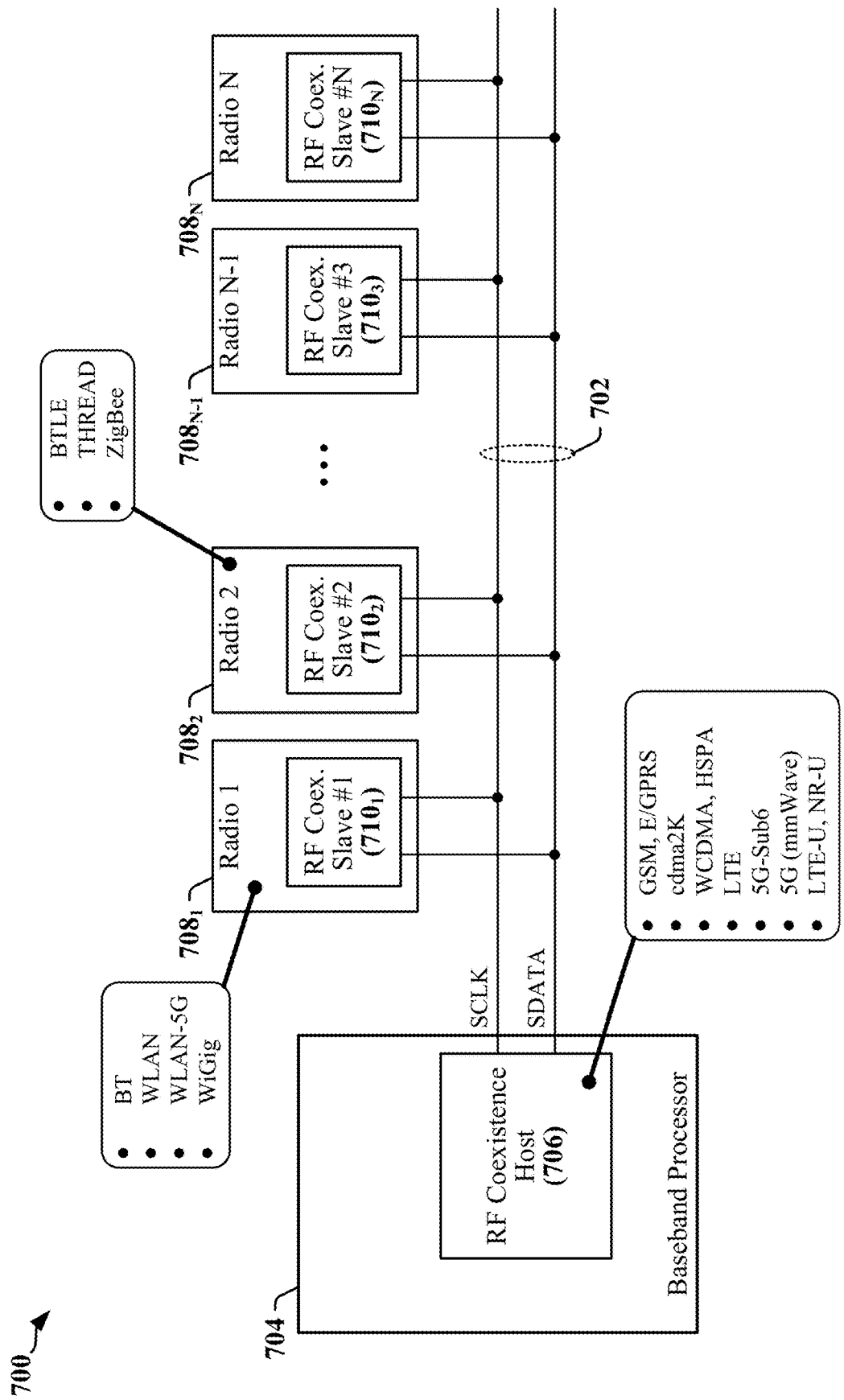
FIG. 7 illustrates an example of a system configured in accordance with certain aspects disclosed herein.

FIG. 7 illustrates an example of a system 700 configured in accordance with certain aspects disclosed herein. The system 700 includes a serial bus 702 operated in accordance with an SPMI protocol. In other examples, the serial bus 702 may be operated using another bus protocol such as the RFFE protocol. The serial bus 702 may be used to implement a coexistence management interface in accordance with certain aspects disclosed herein. A baseband processor 704 is coupled to the serial bus 702 through an RF coexistence interface 706, and each of a number of the RF devices $708_1$-$708_N$ is coupled to the serial bus 702 through corresponding RF coexistence interface $710_1$-$710_N$.

In the illustrated system, the baseband processor 704 and the RF devices $708_1$-$708_N$ may include, manage or control radios that support more than one radio access technology (RAT). The baseband processor 704 may include or cooperate with multiple Wireless wide area network (WWAN) RATs, including various 4G and 5G RATs. A first RF device $708_1$ may support Bluetooth (BT) and multiple WLAN RATs. Other RF devices $708_2$-$708_N$ may support these and other RATs. For Real-Time control, one-byte control messages between the baseband processor 704 or an RF device $708_1$-$708_N$ should be transmitted in 2.5 µs or less, consistent with transmission latency for a UART CxMI operated at 4 Mbps. One or more radios in the baseband processor 704 or the RF devices $708_1$-$708_N$ may be addressed using virtual addresses assigned per radio or according to the RAT supported by an RF device $708_1$-$708_N$.

RFFE, SPMI and certain other protocols that provide communication over a multi-drop serial bus can have certain common features. In one example, the structure of datagrams used to transmit command, control and data payloads over multi-drop serial buses may exhibit some similarities between protocols. In other example, similarities may exist between interrupt techniques, address assignment procedures, addresses used to select devices to receive or transmit data, clock generation and management of device priorities.

FIG. 8 illustrates datagram structures 800, 820 for a Register Write command and an Extended Register Write command. The datagram structures 800, 820 include certain elements that may be present in datagram structures defined by SPMI and/or RFFE protocols. In some instances, the datagram structures 800, 820 may be used to efficiently write data to registers within the addressable register address range of a slave device operated in accordance with SPMI and/or RFFE protocols. These datagram structures 800, 820 and similar or comparable datagram structures defined by other protocols may be adapted for use in systems implemented in accordance with certain aspects disclosed herein. The datagram structures 800, 820 commence with transmission of a two-bit sequence start condition (the SSC 802, 822) followed by a four-bit device ID 804, 824. A nine-bit command field 806, 826 is transmitted next. In the Register Write command datagram structure 800, the nine-bit command field 806 includes a three-bit command code 812, a five-bit address field 814 and a parity bit. In the Extended Register Write command datagram structure 820, the nine-bit command field 806 is occupied by an eight-bit command code and a parity bit and followed by an address field 828 that carries an eight-bit register address and a parity bit. In the Register Write command datagram structure 800, a data field 808 carries a single data byte, while in the Extended Register Write command datagram structure 820 the data field 830 carries up to 16 data bytes. Each data byte is transmitted with a parity bit. Bus park signaling 810, 832 terminates the datagram structures 800, 820. While the concepts disclosed herein are applicable to various serial bus protocols and standards, the example of SPMI or RFFE protocols is frequently used herein to illustrate certain aspects of this disclosure.

Continuously changing wireless communication technologies continually produce new configurations of RFFE interfaces and increased complexity of RFFE bus architectures. Changes and evolution of technology can increase the potential for traffic congestion on one or more RFFE buses provided in a communication device. In one example, RFFE bus congestion and timing bottlenecks can be expected in wireless handsets that support coexistence between 4G and 5G wireless communication technologies. In another example, support for carrier aggregation (CA) can increase RFFE bus timing complexity because of increased bus contention events. For example, a bus owner/master (BoM) using conventional protocols and techniques may be unable to dynamically communicate a large number of settings to a large number of RFFE devices within the timeline defined for communicating data frames in a 5G network, including when the number of modes and specified behaviors for 5G networks increases.

According to certain aspects of this disclosure, standards-defined protocols can be adapted to enable a multidrop serial bus to serve as a coexistence management interface. The example of SPMI protocols and datagram structures are used to illustrate certain aspects of the adaptation of standards-defined protocols for the presently-disclosed coexistence management interface. In one example, an Extended Register Write datagram may be adapted for use as an RF Co-Existence datagram. Bi-directionality can be supported using slave-initiated signaling to trigger SSC transmission by the master device. In one illustrated example based on the of FIG. 7, the coexistence management interface provided using SPMI protocols may be configured such that one master device (e.g., the baseband processor 704) and up to 7 RF devices 708₁-708ₙ (where N=7) may be supported for the purpose of exchanging CxM messages. In various examples, physical RF device 708₁-708ₙ, may support up to 16 virtual clients that can be associated with different RATs.

Figure 9:
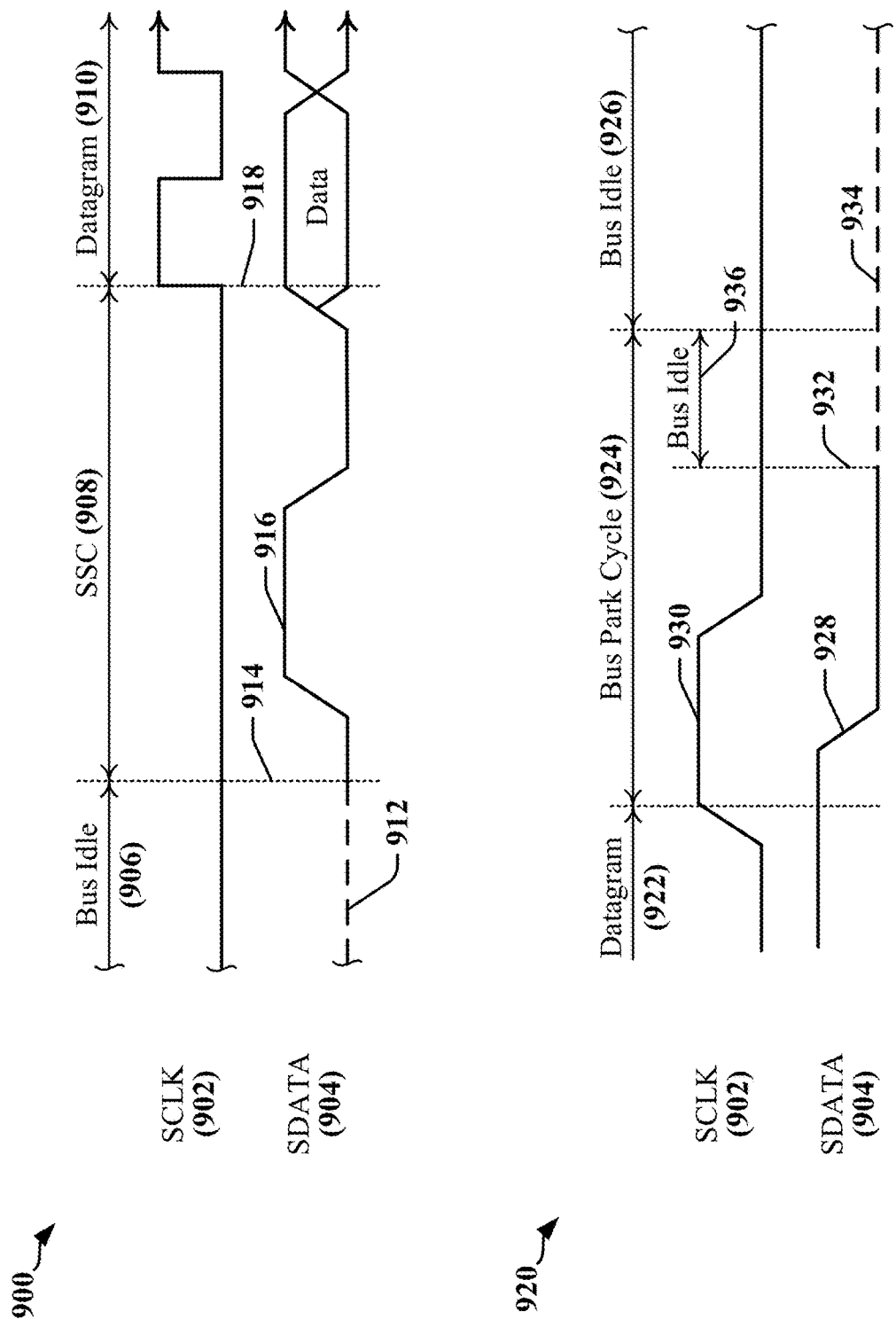
FIG. 9 illustrates signaling that is transmitted to delineate the boundaries of certain datagrams that may be adapted in accordance with certain aspects of this disclosure.

FIG. 9 includes timing diagrams 900, 920 that illustrate signaling that is transmitted to delineate the boundaries of SPMI or RFFE datagrams. The timing diagrams 900, 920 show the relative timing of signals transmitted on SCLK 902 and SDATA 904. The first timing diagram 900 illustrates timing of an SSC 908 that is transmitted to signal the start of a datagram 910. The SSC 908 is transmitted when the serial bus is in an idle state 906. In the idle state 906, SCLK 902 is driven at full strength by a bus master while slave devices coupled to the serial bus present a high impedance to SCLK 902. SCLK 902 is held in the low signaling state (here, at zero volts) by the bus master. In the idle state 906, SDATA 904 is weakly driven by the bus master and held or maintained in the weakly driven low signaling state 912. The weakly driven low signaling state 912 can easily be overcome by another line driver that can drive SDATA 904 at full strength.

In a conventional master-driven SSC 908, the bus master commences transmission of the SSC 908 at a first point in time 914 when it begins to drive SDATA 904 at full strength, initially at the low signaling state. The bus master then provides a pulse 916 on SDATA 904 while continuing to drive SCLK 902 to the low signaling state. The pulse 916 has duration of at least one cycle of a clock signal provided on SCLK 902 during transmission of a datagram 910. At a second point in time 918, the bus master commences transmission of clock pulses on SCLK 902, thereby providing the clock signal used to control or indicate timing of a datagram 910 transmitted on SDATA 904.

The second timing diagram 920 illustrates timing of a bus park cycle (the BPC 924) that may be transmitted to signal the termination of a datagram 922, for example. The BPC 924 is transmitted by providing a falling edge 928 on SDATA 904 while SCLK 902 is in a high signaling state 930. Transitions on SDATA 904 are permitted low portion of the clock signal during transmission of the datagram 922, and the falling edge 928 is clearly recognizable as BPC 924 signaling. The falling edge 928 is provided by the bus master driving SDATA 904 low at full strength. The bus master then drives SCLK 902 low and continues to drive SCLK 902 at full strength through subsequent bus idle intervals 926, 936. After driving SCLK 902 low, the bus master initiates a bus idle interval 936 at a time 932 when the bus master causes SDATA 904 to enter the weakly driven low signaling state 934. The BPC 924 is terminated and the serial bus enters a bus idle interval 926 until the next datagram is ready for transmission.

Figure 10:
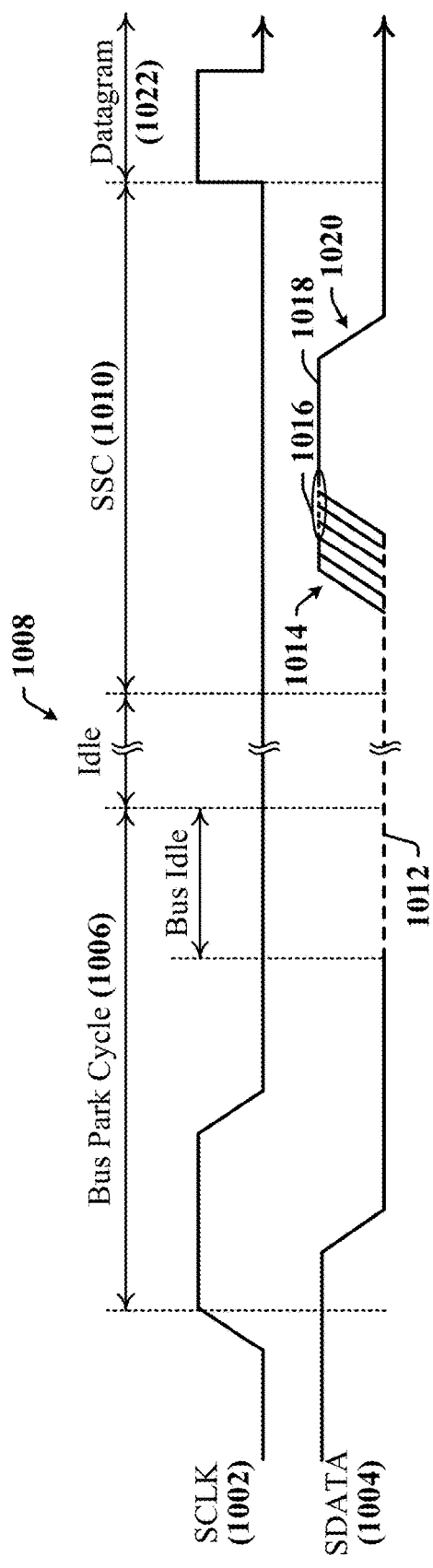
FIG. 10 illustrates a slave-initiated start sequence provided in accordance with certain aspects of this disclosure.

FIG. 10 is a timing diagram 1000 that illustrates a slave-initiated SSC 1010 provided on a serial bus in accordance with certain aspects of this disclosure. The serial bus may be in an idle state 1008 after a BPC 1006 has been previously signaled. In the idle state 1008, pulses are suppressed on SCLK 1002 and SDATA 1004 is weakly driven by the bus master and held in a weakly-driven low signaling state 1012. The weakly driven low signaling state 1012 can easily be overcome by another line driver that attempts to drive SDATA 904 at full strength. A slave-initiated SSC 1010 is provided when a slave device configures a line driver coupled to SDATA 1004 for full-strength driving and then provides a positive-going transition 1014 on SDATA 1004. As illustrated in FIG. 10, other slave devices may drive SDATA 1004 with some timing variability. A slave device that provided the positive-going transition 1014 on SDATA 1004 may configure its line driver coupled to SDATA 1004 to weakly drive SDATA 1004 at the high signaling state for a period of time 1016 until the bus master detects the positive-going transition 1014 on SDATA 1004 or weakly-driven the high signaling state and may begin to drive SDATA 904 at full strength at the high signaling state 1018. The bus master may then provide a transition 1020 to the low signaling state, thereby completing the SSC 1010 and beginning transmission of a datagram 1022.

Figure 11:
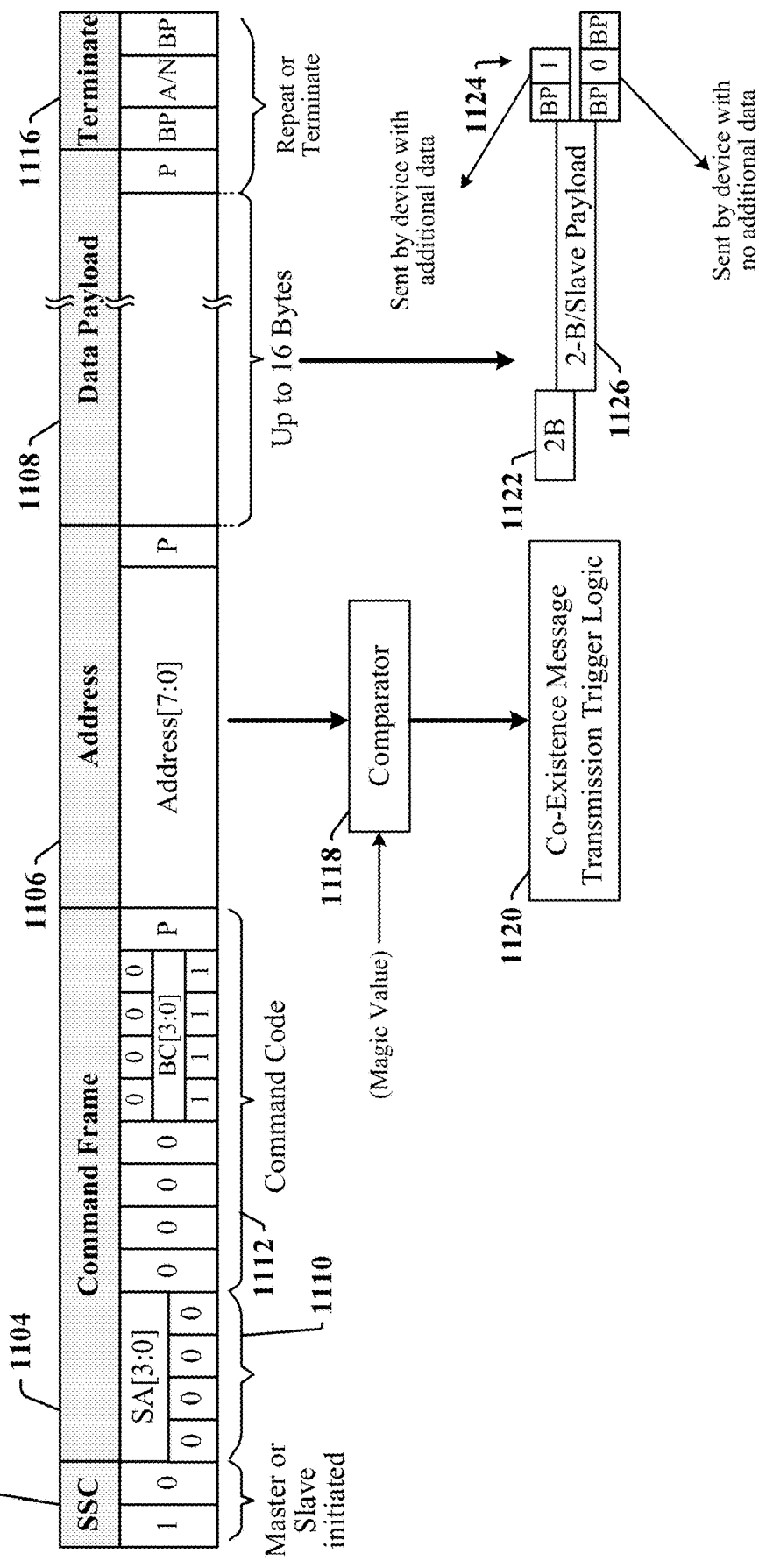
FIG. 11 illustrates an RF coexistence datagram configured in accordance with certain aspects of this disclosure.

FIG. 11 illustrates an RF Coexistence Datagram 1100 configured in accordance with certain aspects of this disclosure. In some examples, the RF Coexistence Datagram 1100 can be based on an SPMI Extended Register Write datagram. The RF Coexistence Datagram 1100 commences with transmission of a two-bit SSC 1102 followed by a command frame 1104. The SSC 1102 may be wholly provided by a bus master or may be initiated by a slave device and completed by a bus master (see the slave-initiated SSC 1010 of FIG. 10). The command frame 1104 includes a four-bit slave address 1110, each bit of which being set to zero to indicate a broadcast. A nine-bit command code 1112 is transmitted next. The nine-bit command code 1112 includes an eight-bit command code 1112, including a four bit, all-zero write code and a four-bit byte count followed by a parity bit. The byte count indicates the number of data bytes carried in the payload 1108, which may be calculated based on the number of slave devices that will be configured to transmit CxM messages. An address field 1106 is transmitted after the command frame 1104, followed by the data payload 1108 and a termination field 1116.

The address field 1106 is configured with a special value (the "Magic Value") that indicates the transmission to be an RF Coexistence Datagram 1100. The Magic Value may also be referred to herein as a coexistence management identifier. In a conventional Extended Register Write datagram, the address field 1106 is configured with the address of the first register to be written and is expected to carry a valid register address. The Magic Value provided in the address field 1106 of an RF Coexistence Datagram 1100 is perceived as an invalid address and ignored by a conventional slave device. A slave device configured in accordance with certain aspects of this disclosure may include an address comparator circuit or module 1118 that compares the address field 1106 with a preconfigured copy of the Magic Value or another register address corresponding to the coexistence management identifier. The address comparator circuit or module 1118 may enable CxM message transmission modules or circuits 1120 when the address detected in the address field 1106 corresponds to the coexistence management identifier. In one example, the address detected in the address field 1106 corresponds to the coexistence management identifier when the address is equal to a preconfigured Magic Value maintained by the receiving device. In another example, the address detected in the address field 1106 corresponds to the coexistence management identifier when the address lies within a range identified by preconfigured information maintained by the receiving device. The address comparator circuit or module 1118 may enable CxM message transmission modules or circuits 1120 when the address detected in the address field 1106 corresponds to the coexistence management identifier.

The CxM message transmission modules or circuits 1120 in each slave device may be configured to populate a portion of the data payload 1108 with a coexistence message. In one example, each coexistence message includes two bytes and the timing of the transmission within the data payload 1108 by each slave device may be determined by the slave address of the slave device. In the illustrated example, the first two bytes 1122 of the data payload 1108 are allocated for the use the bus master and the slave devices may use succeeding two-byte slots 1126 that may be numbered according to slave address. For example, the slave device with address '0001 may transmit immediately following the two bytes in the data payload 1108 transmitted by the bus master, with the slave device with address '0010 transmitting next, and so on. A device may refrain from transmitting within its slot and the two bytes in the slot have all-zero values due to weak driving or pull down.

In accordance with certain aspects of this disclosure, each of the slave devices may transmit CxM messages to the bus master or to any of the other slave device. The bus master may transmit CxM messages to any of the slave devices. CxM messages may be directed to virtual addresses within the bus master or within an addressed slave device. In some instances, the bus master or a slave device may have multiple messages to transmit when the RF Coexistence Datagram 1100 is initiated. In an aspect of this disclosure, the RF Coexistence Datagram 1100 may be extended to permit multiple data payloads 1108 to be transmitted. The termination field 1116 is transmitted after each data payload 1108 to indicate whether the current data payload 1108 is the last data payload 1108 in the RF Coexistence Datagram 1100. In one example, an A/N bit 1124 (acknowledgement/negative acknowledgement bit or ACK/NACK bit) may be used to indicate whether additional payloads are available for transmission. For example, any slave device that has more CxM messages to transmit may drive the A/N bit 1124 high to request extension of the RF Coexistence Datagram 1100. The bus master may continue the RF Coexistence Datagram 1100 when it has CxM messages to be sent, or when one or more slave devices indicates CxM messages to be sent. The bus master may weakly drive the SDATA line low for the duration of the A/N bit 1124 such that any slave device can strongly drive SDATA high to indicate a request to extend the RF Coexistence Datagram 1100. Multiple slave devices driving SDATA during the A/N bit 1124 drive the line to the same level and it can be expected that no crossbar conflicts will result. The bus master transmits bus park signaling after the A/N bit 1124, when the bus master determines that the RF Coexistence Datagram 1100 should be terminated.

Figure 12:
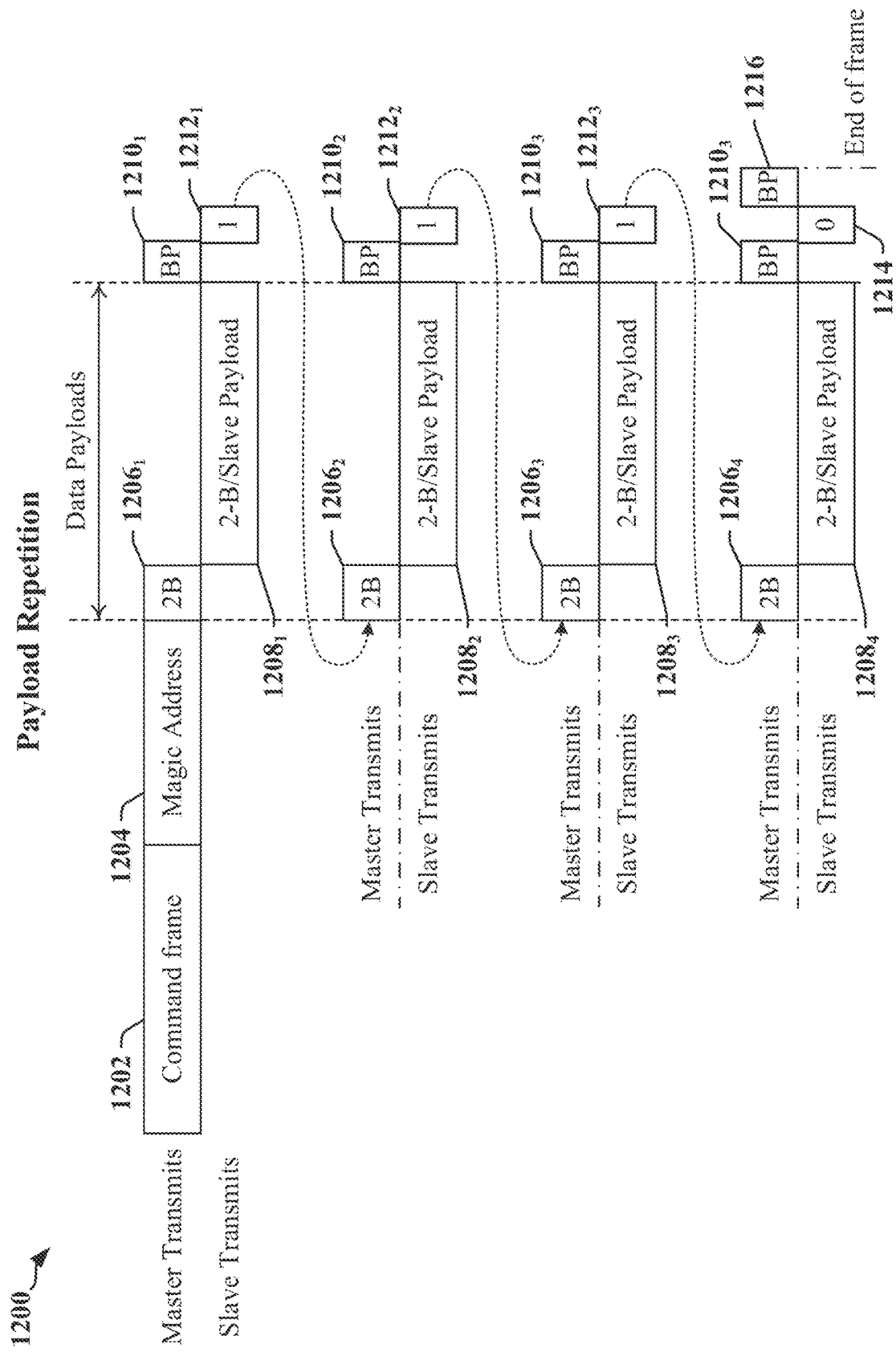
FIG. 12 illustrates an example of payload repetition in accordance with certain aspects of this disclosure.

FIG. 12 illustrates an example of payload repetition 1200 in accordance with certain aspects of this disclosure. In this example, certain transmissions on SDATA are illustrated during a RF Coexistence Datagram. The RF Coexistence Datagram is identified based on the command frame 1202 and the magic address 1204. The bus master may commence transmission of the first data payload by transmitting a two-byte CxM message $1206_1$. When the bus master has no CxM messages for transmission, an all-zero two-byte CxM message $1206_1$ may be transmitted. The bus master then weakly drives SDATA low and provides clock pulses for the slave-driven portion $1208_1$ of the first data payload. The bus master then transmits bus park signaling $1210_1$ before weakly driving SDATA low. In the illustrated example, at least one slave device drives the A/N bit $1212_1$ high to request payload repetition. The bus master accepts all requests for repetition in the illustrated example, although the bus master may deny a request for repetition. In some implementations the bus master may deny a request for repetition by transmitting bus park signaling after the A/N bit $1212_1$-$1212_3$ to terminate the RF Coexistence Datagram.

The bus master may commence transmission of the second data payload by transmitting a two-byte CxM message $1206_2$. When the bus master has no CxM messages for transmission, an all-zero two-byte CxM message $1206_2$ may be transmitted. The bus master then weakly drives SDATA low and provides clock pulses for the slave-driven portion $1208_2$ of the second data payload. The bus master then transmits bus park signaling $1210_2$ before weakly driving SDATA low. In the illustrated example, at least one slave device drives the A/N bit $1212_2$ high to request payload repetition. The bus master may then commence transmission of the third data payload by transmitting a two-byte CxM message $1206_3$. When the bus master has no CxM messages for transmission, an all-zero two-byte CxM message $1206_3$ may be transmitted. The bus master then weakly drives SDATA low and provides clock pulses for the slave-driven portion $1208_3$ of the third data payload. The bus master then transmits bus park signaling $1210_3$ before weakly driving SDATA low. In the illustrated example, at least one slave device drives the A/N bit $1212_3$ high to request payload repetition. The bus master may then commence transmission of the fourth data payload by transmitting a two-byte CxM message $1206_4$. When the bus master has no CxM messages for transmission, an all-zero two-byte CxM message $1206_4$ may be transmitted. The bus master then weakly drives SDATA low and provides clock pulses for the slave-driven portion $1208_4$ of the fourth data payload. The bus master then transmits bus park signaling $1210_4$ before weakly driving SDATA low. In the illustrated example, no slave device drives the A/N bit $1212_4$ high to request payload repetition and the bus master has no CxM messages for transmission, and the bus master transmits bus park signaling 1216 to idle the serial bus.

Figure 13:
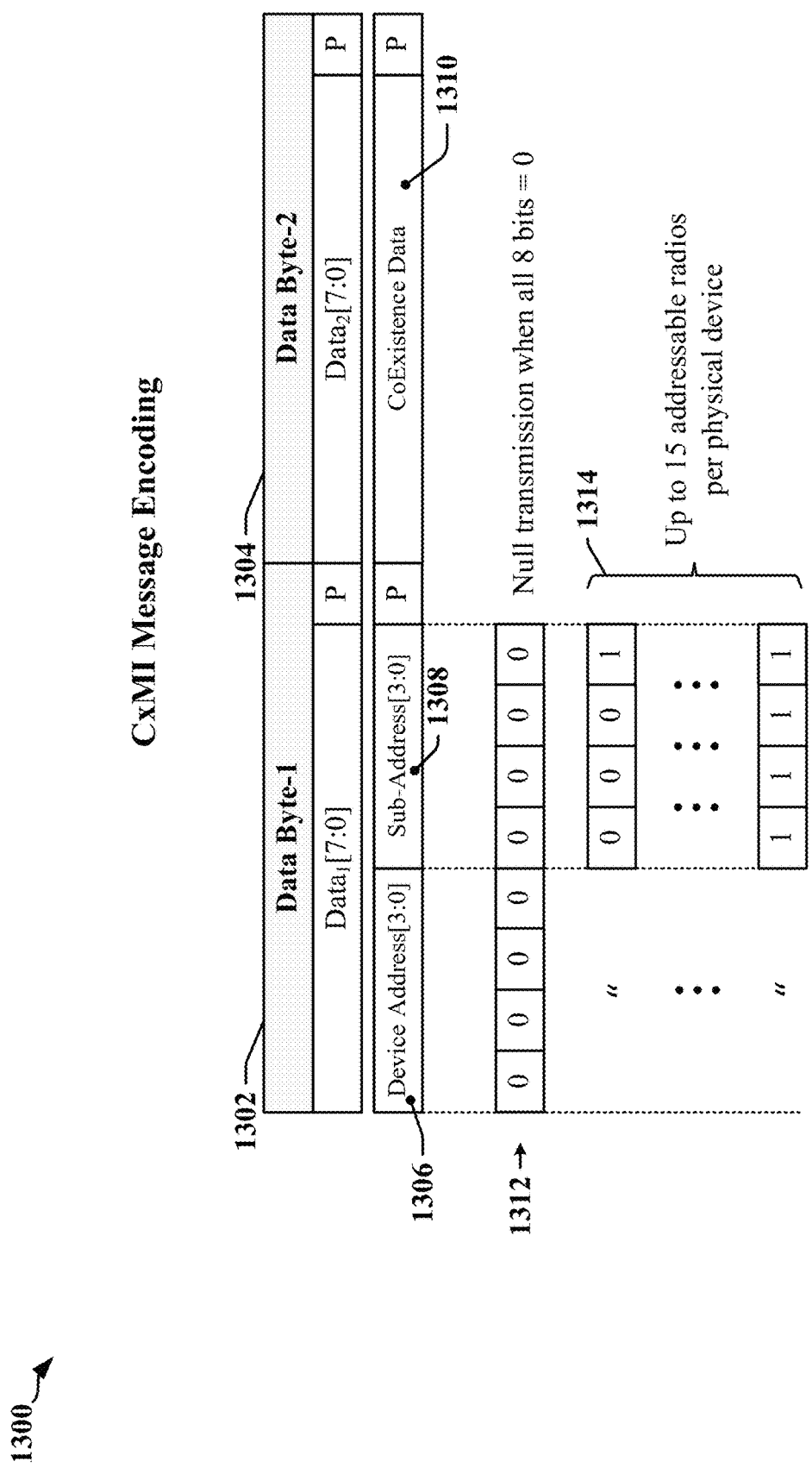
FIG. 13 illustrates one example of coexistence management message coding in accordance with certain aspects of this disclosure.

FIG. 13 illustrates one example of CxM message coding 1300 transmitted in accordance with certain aspects of this disclosure. In the illustrated example, the CxM message coding 1300 applies to a data payload 1108 of the RF Coexistence Datagram 1100 of FIG. 11 and may be used in the system 700 illustrated in FIG. 7. Other encoding schemes or systems may be used when different numbers of physical RF devices $708_1$-$708_N$, or different numbers of virtual clients are supported per device. Other encoding schemes or systems may be used to support prioritization schemes or to optimize or minimize null transmissions when one or more physical RF devices $708_1$-$708_N$ have no CxM messages for transmission. In some examples, an encoding scheme may provide more data bytes in the data payload for transmission of CxM messages by each physical RF device $708_1$-$708_N$. In some examples, an encoding scheme may provide a single data byte in the data payload 1108 for transmission of CxM messages by each physical RF device $708_1$-$708_N$.

In the illustrated example, each physical RF device $708_1$-$708_N$ is allocated two bytes 1302, 1304 in the initial data payload 1108 and in repetitions of the data payload field. The first byte 1302 encodes addressing information. A first four bits 1306 encodes device address of the physical RF device $708_1$-$708_N$ that is the target of the CxM message. The second four bits 1308 encodes a virtual address of a radio within the physical RF device $708_1$-$708_N$ that is the target of the CxM message. The second byte 1304 carries coexistence information 1310. The coexistence information 1310 may be transmitted as one of the message types defined in the table 640 in FIG. 6, for example. In some implementations, a null transmission is indicated when the first byte 1302 contains all-zero values 1312. In some implementations, the coexistence information 1310 may be configured based on application requirements or based on standards defined formats. A null transmission may occur when an RF device $708_1$-

$708_N$ has no CxM messages to transmit. In some implementations the RF device $708_1$-$708_N$ remains in high-impedance state with respect to SDATA and the bus master weakly drives SDATA to a low signaling state for the duration of time allocated to transmit the two bytes for the non-transmitting RF device $708_1$-$708_N$. In the illustrated example, each RF device $708_1$-$708_N$ can transmit CxM messages to up to 15 addressable radios using a virtual address 1314 encoded in the second four bits 1308 of the first byte 1302.

In some implementations, the order in which RF devices $708_1$-$708_N$ transmit CxM messages is determined by the unique serial bus address assigned to the RF devices $708_1$-$708_N$. In some implementations, the order in which RF devices $708_1$-$708_N$ transmit CxM messages is determined by a register configured in each of the RF devices $708_1$-$708_N$ by a bus master.

Figure 14:
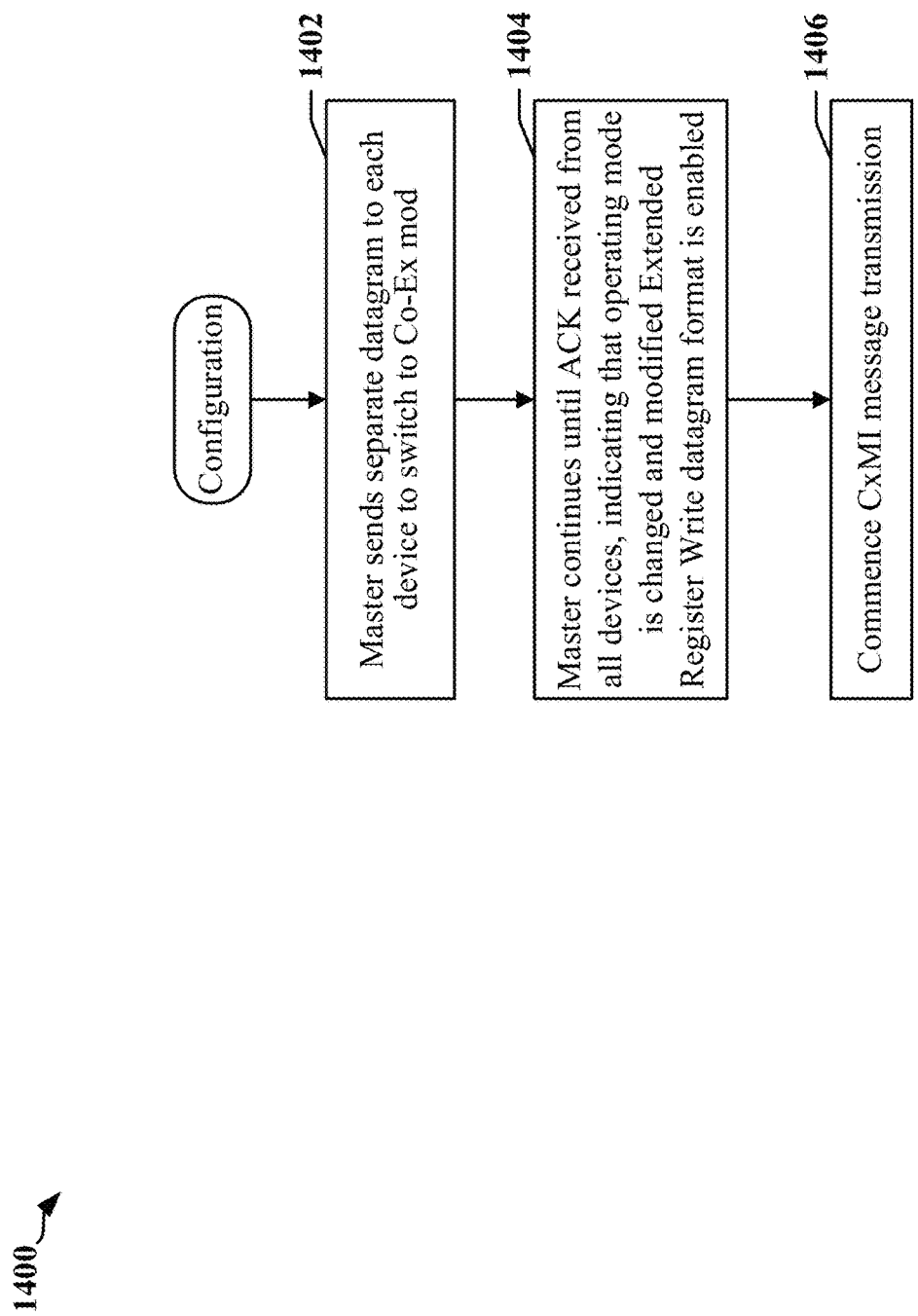
FIG. 14 illustrates a procedure that may be implemented to configure one or more RF devices to operate a serial bus as a coexistence management interface configured in accordance with certain aspects of this disclosure.

FIG. 14 illustrates a procedure 1400 that may be implemented to configure one or more RF devices $708_1$-$708_N$ when a serial bus is operated as a coexistence management interface. At block 1402, a bus master may configure each RF device $708_1$-$708_N$ by transmitting one or more datagrams that provide addressing and timing information, and that enable a CxMI mode of operation. At block 1404, the bus master terminates the configuration after receiving acknowledgement from each of the RF devices $708_1$-$708_N$ that the CxMI mode of operation is active. At block 1406, the bus master may begin transmitting RF Coexistence Datagrams 1100 as needed or requested.

The RF devices $708_1$-$708_N$ may transmit CxM messages based on a count of clock ticks or pulses. A clock tick may be provided for each bit in a datagram. In one example, the bus aster provides a fixed, determinable of number of clock pulses to transmit the RF Coexistence Datagram 1100. Table 1 shows the number of clock pulse, or clock ticks used to transmit the various fields of the RF Coexistence Datagram 1100.

TABLE 1

| Field | Clock Ticks |
| --- | --- |
| SSC | 2 |
| Slave Address | 4 |
| Command Code | 9 |
| Magic Address | 9 |
| BC, A/N per Payload | 2 |
| Final BC | 1 |

In the example illustrated in Table 1, the first payload begins after 24 clock ticks. Each 2-byte CxM message opportunity, including the CxM message opportunity allocated for the bus master uses 18 clock ticks when parity is transmitted. The BP and A/N bits are transmitted using two clock bits. In the illustrated example, the first payload commences after 24 clock ticks.

Table 2 illustrates the transmission latency for the RF Coexistence Datagram 1100 illustrated in FIG. 11 for different clock frequencies. The transmission latency is calculated as the total time to transmit an RF Coexistence Datagram 1100.

TABLE 2

| Total Devices, ticks | 26 MHz | 38.4 MHz | 57.6 MHZ | 76.8 MHz |
| --- | --- | --- | --- | --- |
| Master + 4, 117 | 4.50 µs | 3.05 µs | 2.03 µs | 1.52 µs |
| Master + 7, 171 | 6.58 µs | 4.45 µs | 2.97 µs | 2.23 µs |

Table 2 illustrates timing for a configuration of a bus with 4 RF devices $708_1$-$708_N$ and timing for a configuration of a bus with 7 RF devices $708_1$-$708_N$. A total of 117 clock ticks is expended for the former configuration and total of 171 clock ticks is expended for the latter configuration. Using the UART-based CxMI byte transfer rate of 2.5 µs as a benchmark, it can be seen that the presently disclosed CxMI based on serial bus can meet or exceed the benchmark when the clock signal on SCLK is transmitted at 76.8 MHz for both 4 and 7 RF devices $708_1$-$708_N$ configurations, and when the clock signal on SCLK is transmitted at 57.6 MHz for the 4 RF device $708_1$-$708_N$ configuration.

Examples of Processing Circuits and Methods

Figure 15:
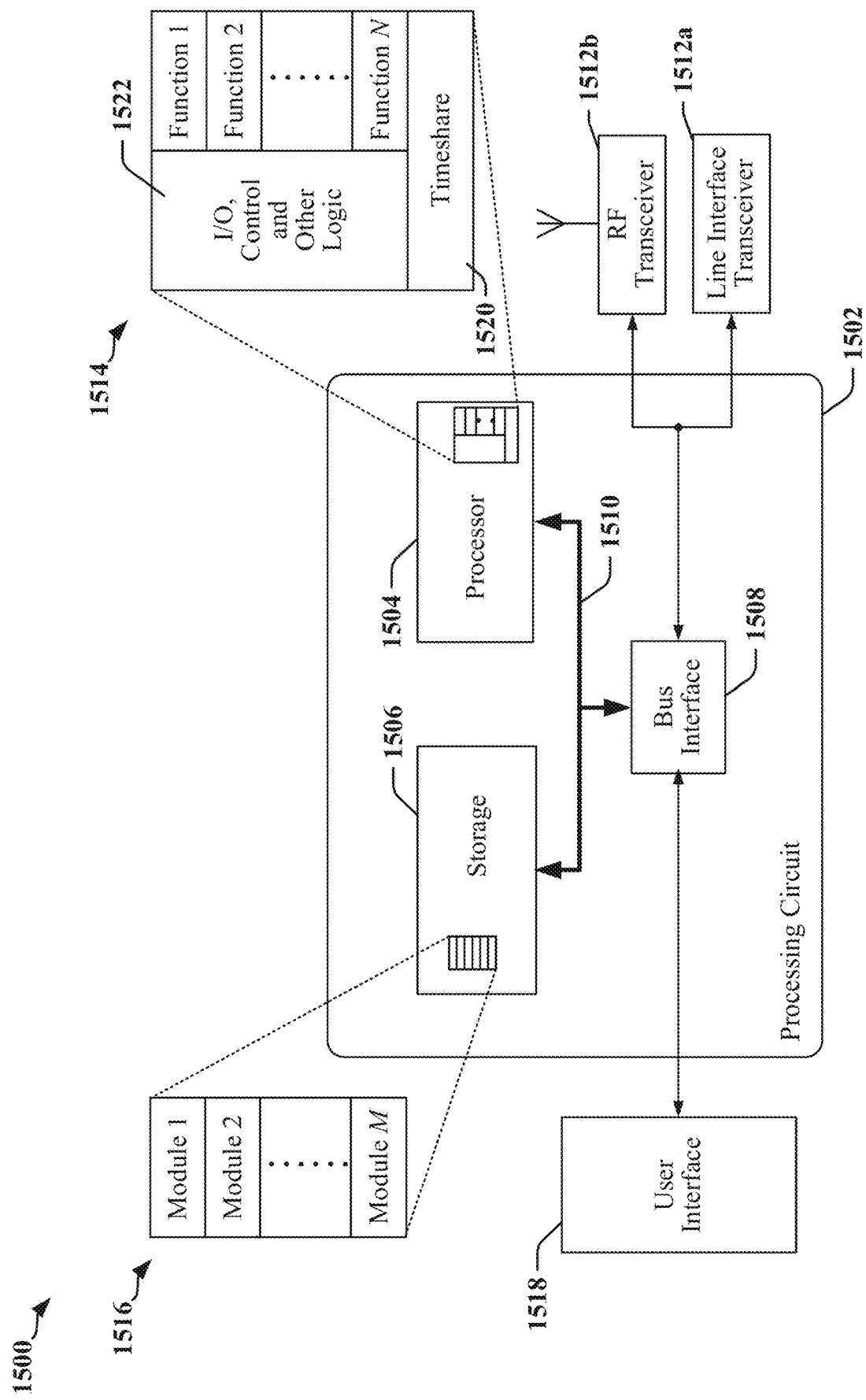
FIG. 15 illustrates one example of an apparatus employing a processing circuit that may be adapted according to certain aspects disclosed herein.

FIG. 15 is a diagram illustrating an example of a hardware implementation for an apparatus 1500. In some examples, the apparatus 1500 may perform one or more functions disclosed herein. In accordance with various aspects of the disclosure, an element, or any portion of an element, or any combination of elements as disclosed herein may be implemented using a processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512*a*, 1512*b*. A transceiver 1512*a*, 1512*b* may be provided for each networking technology supported by the processing circuit. In some instances, multiple networking technologies may share some or all of the circuitry or processing modules found in a transceiver 1512*a*, 1512*b*. Each transceiver 1512*a*, 1512*b* provides a means for communicating with various other apparatus over a transmission medium. In one example, a transceiver 1512*a* may be used to couple the apparatus 1500 to a multi-wire bus. In another example, a transceiver 1512*b* may be used to connect the apparatus 1500 to a radio access network. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement certain methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as a transceiver 1512*a*, 1512*b*, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to a transceiver 1512*a*, 1512*b*, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512*a*, 1512*b*, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
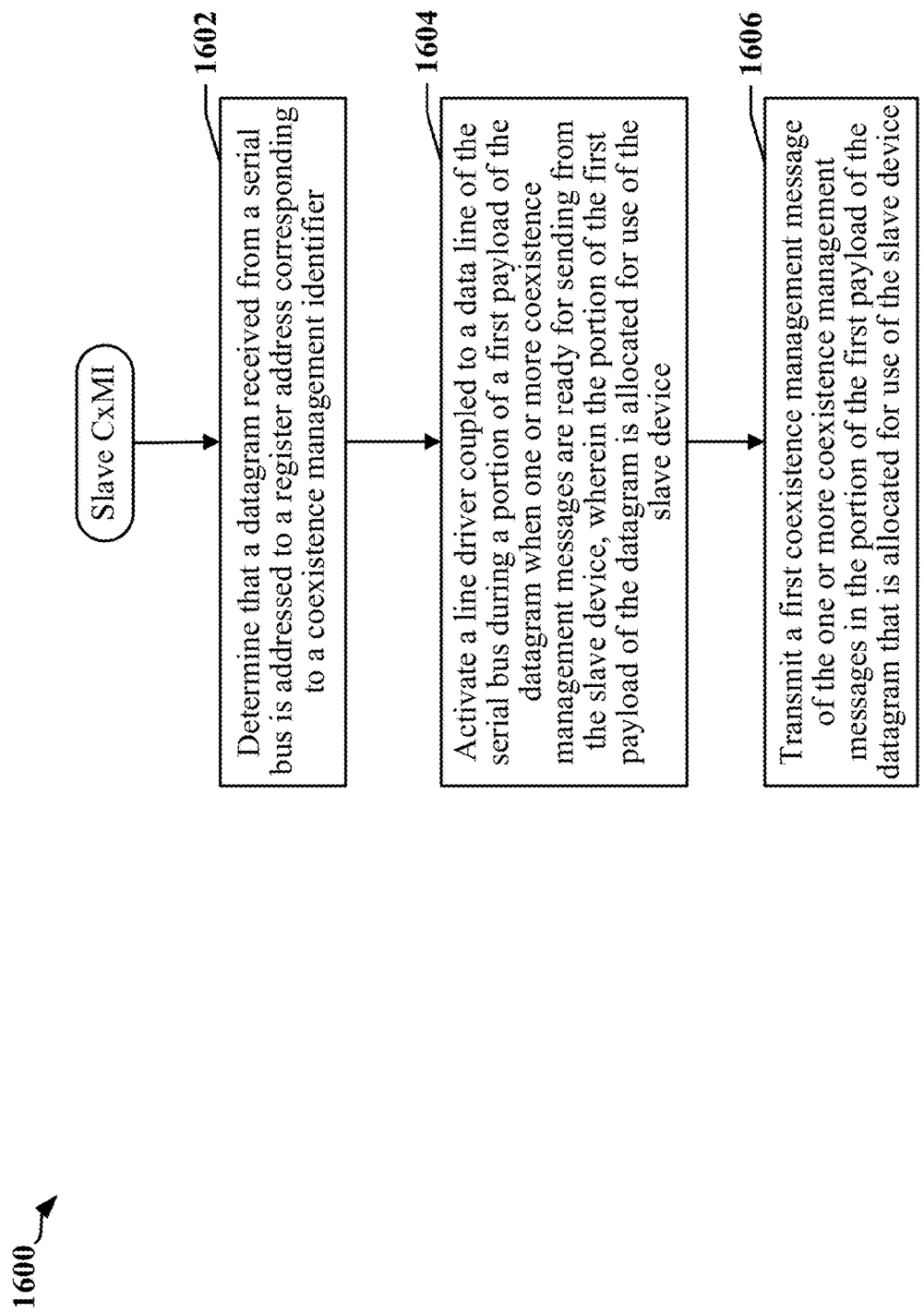
FIG. 16 is a flowchart that illustrates a method that may be performed by a slave device that is coupled to a serial bus in accordance with certain aspects disclosed herein.

FIG. 16 is a flowchart 1600 of a method that may be performed by a slave device coupled to a primary serial bus. In one example, the serial bus may be operated in accordance with SPMI protocols. In another example, the primary serial bus may be operated in accordance with RFFE protocols. In another example, the primary serial bus may be operated in accordance with I3 C protocols.

At block 1602, the slave device may determine that a datagram received from a serial bus is addressed to a register address corresponding to a coexistence management identifier. At block 1604, the slave device may activate a line driver coupled to a data line of the serial bus during a portion of a first payload of the datagram when one or more coexistence management messages are ready for sending from the slave device. The portion of the first payload of the datagram is allocated for use of the slave device. At block 1606, the slave device may transmit a first coexistence management message of the one or more coexistence management messages in the portion of the first payload of the datagram that is allocated for use of the slave device.

In some examples, the slave device may locate the portion of the first payload of the datagram that is allocated for use of the slave device by counting clock pulses on a clock line of the serial bus. The portion of the first payload of the datagram that is allocated for use of the slave device may commence after a number of clock pulses calculated as a multiple of a unique identifier of the slave device. The portion of the first payload of the datagram that is allocated for use of the slave device may commence after a number of clock pulses configured by a bus master.

In certain implementations, the slave device may activate the line driver coupled to the data line of the serial bus during a portion of a second payload of the datagram, the portion of the second payload of the datagram being allocated for use of the slave device. The slave device may transmit a second coexistence management message of the one or more coexistence management messages in the portion of the second payload of the datagram that is allocated for use of the slave device. The slave device may determine that the second coexistence management message is ready for sending from the slave device after completion of the first datagram, and may request the bus master to provide the second payload by driving an acknowledge bit provided after the first payload of the datagram, and when the second coexistence management message is ready for sending.

In some instances, the slave device may refrain from transmitting data in one or more additional payloads of the datagram when no further coexistence management messages are ready for sending from the slave device.

In one example, the slave device may drive the data line to initiate a sequence start condition when the serial bus is idle and when one or more coexistence management messages are ready for sending from the slave device, and may receive the datagram from the serial bus after a bus master completes transmission of the sequence start condition.

In one example, the slave device may transmit the first coexistence management message by addressing the first coexistence management message to the bus master or to a different slave device using an address field in the first coexistence management message. The slave device may address the first coexistence management message to a component of the bus master or of a different slave device using a virtual address field in the first coexistence management message.

Figure 17:
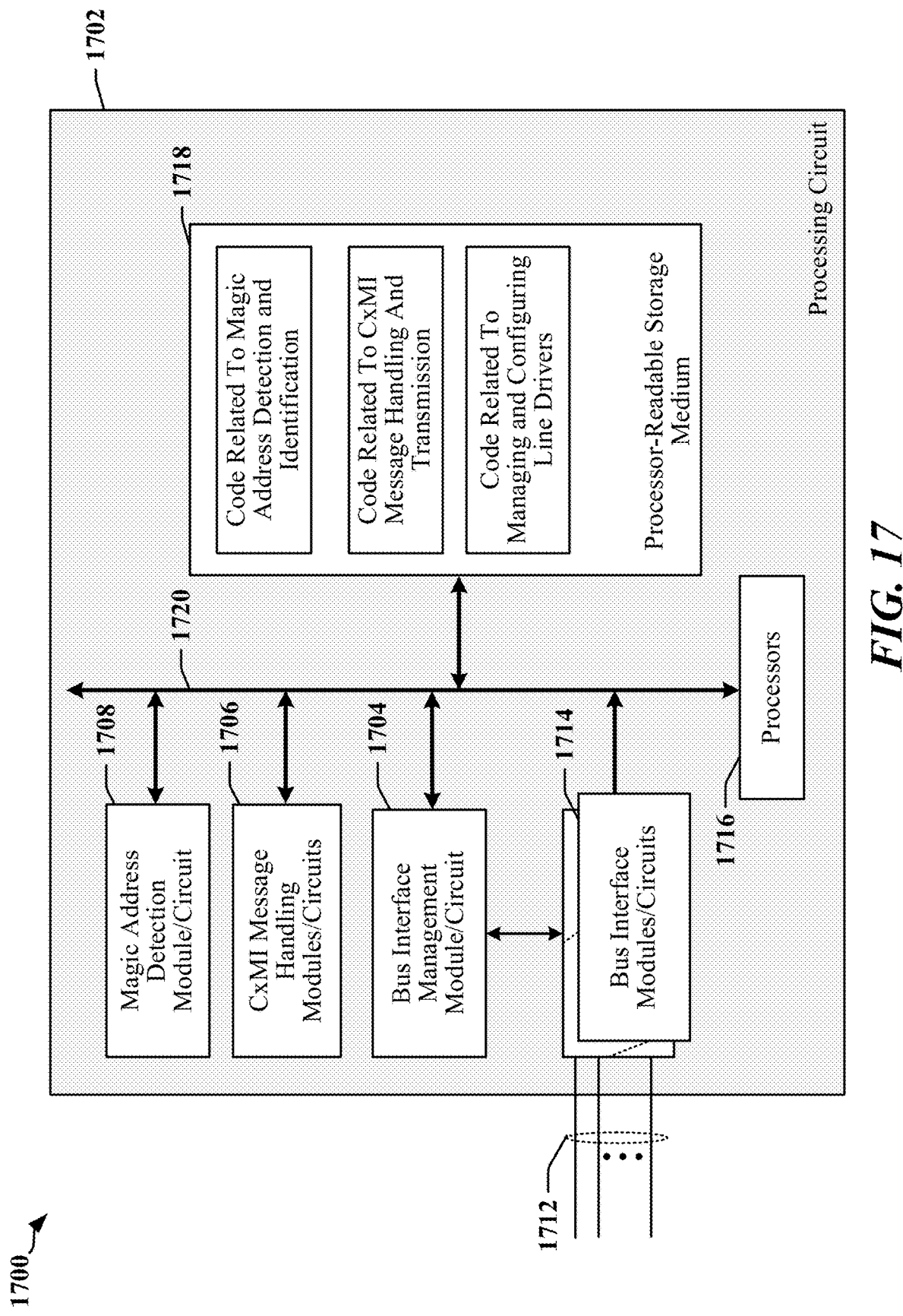
FIG. 17 illustrates a first example of a hardware implementation for an apparatus adapted in accordance with certain aspects disclosed herein.

FIG. 17 is a diagram illustrating an example of a hardware implementation for an apparatus 1700 employing a processing circuit 1702. The processing circuit typically has one or more microprocessors, microcontrollers, digital signal processors, sequencers and/or state machines, represented generally by the processors 1716. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors 1716, the modules or circuits 1704, 1706 and 1708 and the processor-readable storage medium 1718. One or more bus interface circuits and/or modules 1714 may be provided to support communications over multiple serial buses 1712. The bus 1720 may also link various other circuits such as timing sources, peripherals, voltage regulators, and power management circuits, which are well known in the art, and therefore, will not be described any further.

The processors 1716 may be responsible for general processing, including the execution of software, code and/or instructions stored on the processor-readable storage medium 1718. The processor-readable storage medium 1718 may include a non-transitory storage medium. The software, when executed by the processors 1716, causes the processing circuit 1702 to perform the various functions described supra for any particular apparatus. The processor-readable storage medium may be used for storing data that is manipulated by the processors 1716 when executing software. The processing circuit 1702 further includes at least one of the modules 1704, 1706 and 1708. The modules 1704, 1706 and 1708 may be software modules running in the processors 1716, resident/stored in the processor-readable storage medium 1718, one or more hardware modules coupled to the processors 1716, or some combination thereof. The modules 1704, 1706 and 1708 may include microcontroller instructions, state machine configuration parameters, or some combination thereof.

In one configuration, the apparatus 1700 includes modules and/or circuits 1704 adapted to manage, configure and/or control bus interface circuits and/or modules 1714 including controlling the drive state of one or more line drivers in the bus interface circuits, and modules and/or circuits 1706 adapted to handle coexistence management message exchange over the serial bus in RF coexistence datagrams provided by the bus master. The apparatus 1700 may include modules and/or circuits 1708 adapted to manage magic addresses, slave addresses and information identifying portions of the RF coexistence datagrams allocated for CxM messages transmitted by the apparatus 1700.

In one example, the apparatus 1700 is configured to operate as a slave device that has a first bus interface circuit and/or module 1714 configured to couple the apparatus 1700 to a serial bus, and a controller or other processor. The controller may be configured to determine that a datagram received from the serial bus is addressed to a register address corresponding to a coexistence management identifier, activate a line driver of the bus interface circuit that is coupled to a data line of the serial bus during a portion of a first payload of the datagram when one or more coexistence management messages are ready for sending from the slave device, and transmit a first coexistence management message of the one or more coexistence management messages in the portion of the first payload of the datagram that is allocated for use of the slave device. The portion of the first payload of the datagram may be allocated for use of the slave device.

The controller may be further configured to locate the portion of the first payload of the datagram that is allocated for use of the slave device by counting clock pulses on a clock line of the serial bus. The portion of the first payload of the datagram that is allocated for use of the slave device may commence after a number of clock pulses configured by a bus master or calculated as a multiple of a unique identifier of the slave device.

The controller may be further configured to activate the line driver coupled to the data line of the serial bus during a portion of a second payload of the datagram. The portion of the second payload of the datagram may be allocated for use of the slave device. The controller may be further configured to transmit a second coexistence management message of the one or more coexistence management messages in the portion of the second payload of the datagram that is allocated for use of the slave device, determine that the second coexistence management message is ready for sending from the slave device after completion of the first datagram, and request the bus master to provide the second payload by driving an acknowledge bit provided after the first payload of the datagram when the second coexistence management message is ready for sending.

The controller may be further configured to drive the data line to initiate a sequence start condition when the serial bus is idle and when one or more coexistence management messages are ready for sending from the slave device, and receive the datagram from the serial bus after a bus master completes transmission of the sequence start condition.

The controller may be further configured to address the first coexistence management message to the bus master or to a different slave device using an address field in the first coexistence management message. The controller may be further configured to address the first coexistence management message to a component of the bus master or of a different slave device using a virtual address field in the first coexistence management message.

The processor-readable storage medium 1718 may include instructions that cause the processing circuit 1702 to that a datagram received from a serial bus is addressed to a register address corresponding to a coexistence management identifier, activate a line driver coupled to a data line of the serial bus during a portion of a first payload of the datagram when one or more coexistence management messages are ready for sending from the slave device, and transmit a first coexistence management message of the one or more coexistence management messages in the portion of the first payload of the datagram that is allocated for use of the slave device. The portion of the first payload of the datagram is allocated for use of the slave device.

The processor-readable storage medium 1718 may include instructions that cause the processing circuit 1702 to locate the portion of the first payload of the datagram that is allocated for use of the slave device by counting clock pulses on a clock line of the serial bus. The portion of the first payload of the datagram that is allocated for use of the slave device may commence after a number of clock pulses calculated as a multiple of a unique identifier of the slave device. The portion of the first payload of the datagram that is allocated for use of the slave device may commence after a number of clock pulses configured by a bus master.

The processor-readable storage medium 1718 may include instructions that cause the processing circuit 1702 to activate the line driver coupled to the data line of the serial bus during a portion of a second payload of the datagram, the portion of the second payload of the datagram being allocated for use of the slave device, and transmit a second coexistence management message of the one or more coexistence management messages in the portion of the second payload of the datagram that is allocated for use of the slave device. The processor-readable storage medium 1718 may include instructions that cause the processing circuit 1702 to determine that the second coexistence management message is ready for sending from the slave device after completion of the first datagram, and request the bus master to provide the second payload by driving an acknowledge bit provided after the first payload of the datagram when the second coexistence management message is ready for sending.

The processor-readable storage medium 1718 may include instructions that cause the processing circuit 1702 to refrain from transmitting data in one or more additional payloads of the datagram when no further coexistence management messages are ready for sending from the slave device.

The processor-readable storage medium 1718 may include instructions that cause the processing circuit 1702 to drive the data line to initiate a sequence start condition when the serial bus is idle and when one or more coexistence management messages are ready for sending from the slave device, and the instructions may cause the processing circuit 1702 to receive the datagram from the serial bus after a bus master completes transmission of the sequence start condition.

The processor-readable storage medium 1718 may include instructions that cause the processing circuit 1702 to address the first coexistence management message to the bus master or to a different slave device using an address field in the first coexistence management message. Transmitting the first coexistence management message may include addressing the first coexistence management message to a component of the bus master or of a different slave device using a virtual address field in the first coexistence management message.

Figure 18:
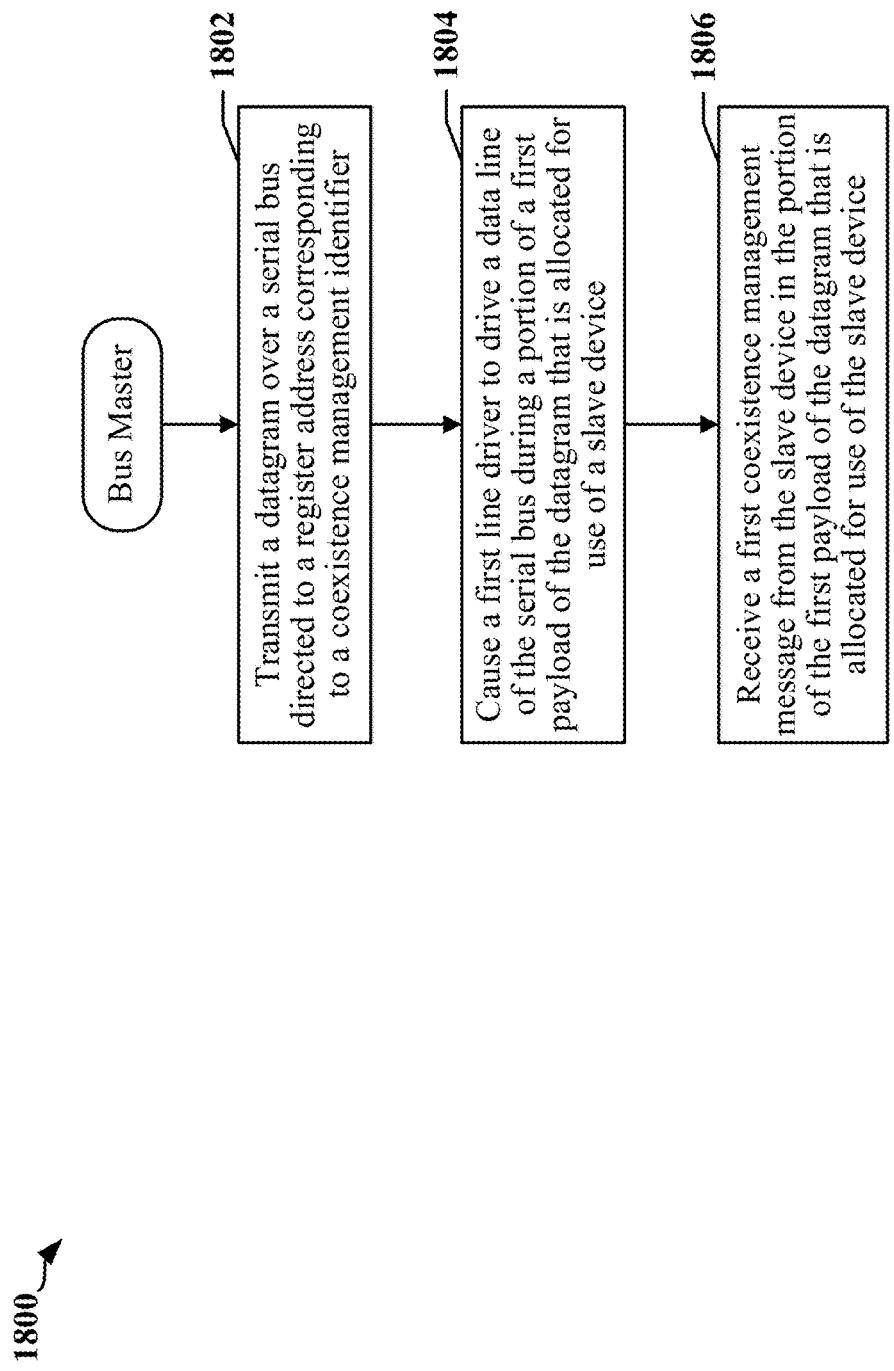
FIG. 18 is a flowchart that illustrates a method that may be performed by a bus master device that is coupled to a serial bus in accordance with certain aspects disclosed herein.

FIG. 18 is a flowchart 1800 of a method that may be performed by a bus master device coupled to a primary serial bus. In one example, the serial bus may be operated in accordance with SPMI protocols. In another example, the primary serial bus may be operated in accordance with RFFE protocols. In another example, the primary serial bus may be operated in accordance with I3C protocols.

At block 1802, the bus master device may transmit a datagram over a serial bus directed to a register address corresponding to a coexistence management identifier. At block 1804, the bus master device may cause a first line driver to drive a data line of the serial bus during a portion of a first payload of the datagram that is allocated for use of a slave device. In some instances, the first line driver weakly drives the data line of the serial bus. At block 1806, the bus master device may receive a first coexistence management message from the slave device in the portion of the first payload of the datagram that is allocated for use of the slave device.

In some examples, the bus master device may configure the slave device with a number of clock pulses that identifies the portion of the first payload of the datagram that is allocated for use of the slave device. The bus master device may receive an acknowledge bit from the slave device after completion of the first payload of the datagram, and provide a second payload in the datagram as a response to the acknowledge bit. The bus master device may cause the first line driver to weakly drive the data line during a portion of the second payload of the datagram allocated for use of the slave device, and to receive a second coexistence management message from the slave device in the portion of the second payload of the datagram that is allocated for use of the slave device.

In certain examples, the bus master device may idle the serial bus by causing the first line driver to weakly drive the data line to a first state, and by causing a second line driver to suppress pulses in a clock line of the serial bus detect. The bus master device may detect that the data line has been driven to the second state indicating initiation of a sequence start condition after the serial bus is idled, complete the sequence start condition by driving the data line to the first state, and transmit the datagram after completing the sequence start condition. The bus master device may initially drive the data line to the second state after transitioning its line driver from idle to active mode and before driving the data line to the first state.

In some examples, the first coexistence management message is addressed to the bus master device or to a slave device using an address field in the first coexistence management message. The first coexistence management message may be addressed to a component in the bus master device or in the different slave device using a virtual address field in the first coexistence management message.

Figure 19:
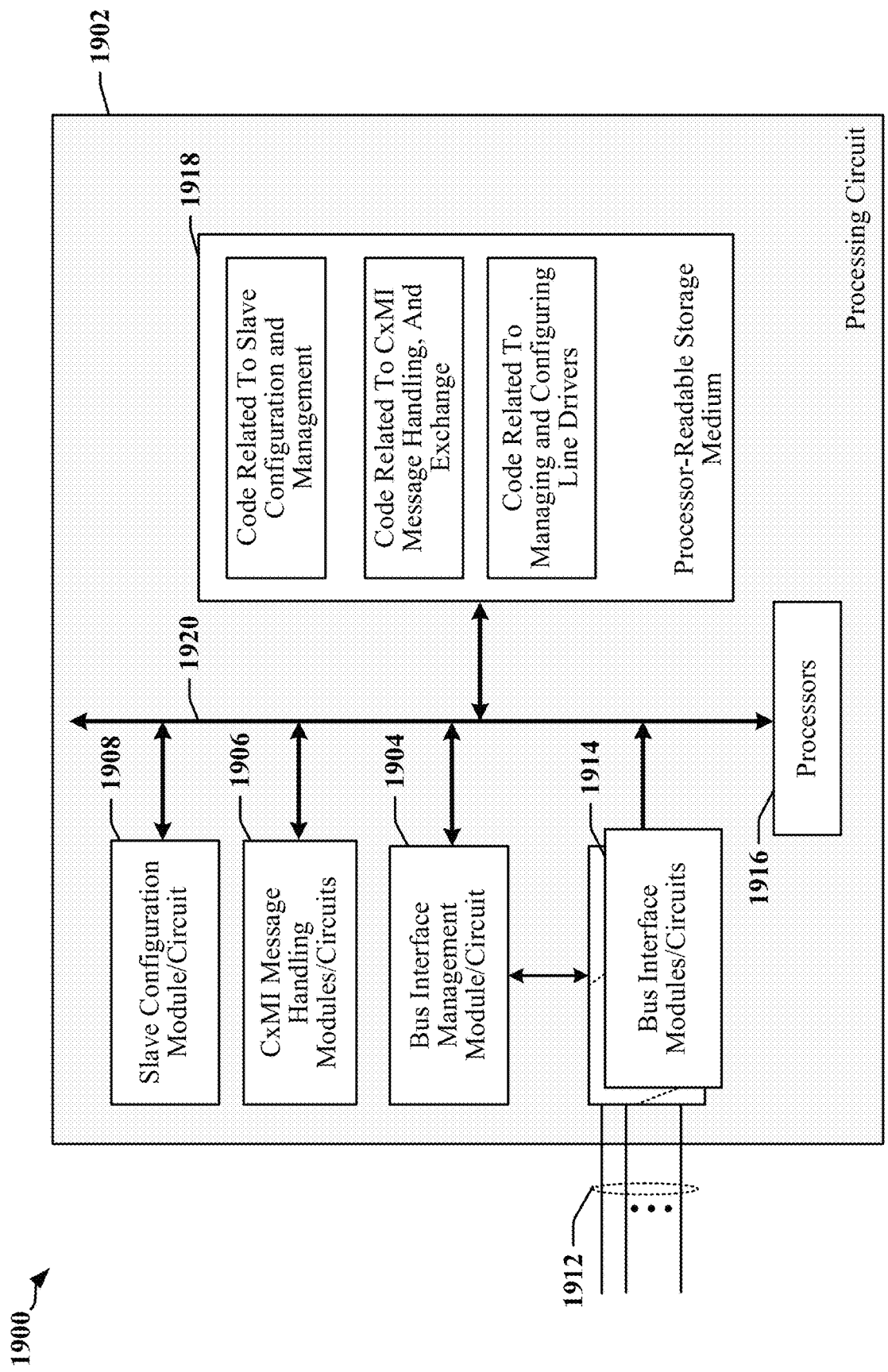
FIG. 19 illustrates a second example of a hardware implementation for an apparatus adapted in accordance with certain aspects disclosed herein.

FIG. 19 is a diagram illustrating a simplified example of a hardware implementation for an apparatus 1900 employing a processing circuit 1902. The processing circuit typically has one or more microprocessors, microcontrollers, digital signal processors, sequencers and/or state machines, represented generally by the processors 1916. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors 1916, the modules or circuits 1904, 1906 and 1908 and the processor-readable storage medium 1918. One or more bus interface circuits and/or modules 1914 may be provided to support communications over multiple serial buses 1912. The bus 1920 may also link various other circuits such as timing sources, peripherals, voltage regulators, and power management circuits, which are well known in the art, and therefore, will not be described any further.

The processors 1916 may be responsible for general processing, including the execution of software, code and/or instructions stored on the processor-readable storage medium 1918. The processor-readable storage medium 1918 may include a non-transitory storage medium. The software, when executed by the processors 1916, causes the processing circuit 1902 to perform the various functions described supra for any particular apparatus. The processor-readable storage medium may be used for storing data that is manipulated by the processors 1916 when executing software. The processing circuit 1902 further includes at least one of the modules 1904, 1906 and 1908. The modules 1904, 1906 and 1908 may be software modules running in the processors 1916, resident/stored in the processor-readable storage medium 1918, one or more hardware modules coupled to the processors 1916, or some combination thereof. The modules 1904, 1906 and 1908 may include microcontroller instructions, state machine configuration parameters, or some combination thereof.

In one configuration, the apparatus 1900 includes modules and/or circuits 1904 adapted to manage, configure and/or control bus interface circuits and/or modules 1914 including controlling the drive state of one or more line drivers in the bus interface circuits, and modules and/or circuits 1906 adapted to handle CxM message exchange over the serial bus and to provide RF coexistence datagrams to carry CxM messages. The apparatus 1900 may include modules and/or circuits 1908 adapted to manage slave configuration including configuring magic addresses, slave addresses and information identifying portions of the RF coexistence datagrams allocated for CxM messages.

In one example, the apparatus 1900 is configured to operate as a data communication apparatus that has a first bus interface circuit and/or module 1914 configured to couple the apparatus 1900 to a serial bus, and a controller or other processor. The controller may be configured to transmit a datagram over a serial bus directed to a register address corresponding to a coexistence management identifier, cause a first line driver to weakly drive a data line of the serial bus during a portion of a first payload of the datagram that is allocated for use of a slave device, and receive a first coexistence management message from the slave device in the portion of the first payload of the datagram that is allocated for use of the slave device.

The controller may be further configured to configure the slave device with a number of clock pulses that identifies the portion of the first payload of the datagram that is allocated for use of the slave device. The controller may be further configured to receive an acknowledge bit from the slave device after completion of the first payload of the datagram, and to provide a second payload in the datagram as a response to the acknowledge bit. The controller may be further configured to cause the first line driver to weakly drive the data line during a portion of the second payload of the datagram allocated for use of the slave device, and receive a second coexistence management message from the slave device in the portion of the second payload of the datagram that is allocated for use of the slave device.

The controller may be further configured to idle the serial bus by causing the first line driver to weakly drive the data line to a first state, causing a second line driver to suppress pulses in a clock line of the serial bus, detect that the data line has been driven to the second state indicating initiation of a sequence start condition after the serial bus is idled, complete the sequence start condition by driving the data line to the first state, and transmit the datagram after completing the sequence start condition. The controller may initially drive the data line to the second state after transitioning its line driver from idle to active mode and before driving the data line to the first state.

The first coexistence management message may be addressed to a bus master device or to a slave device using an address field in the first coexistence management message. The first coexistence management message may be addressed to a component in the bus master device or in another slave device using a virtual address field in the first coexistence management message.

The processor-readable storage medium 1918 may include instructions that cause the processing circuit 1902 to transmit a datagram over a serial bus directed to a register address corresponding to a coexistence management identifier, cause a first line driver to weakly drive a data line of the serial bus during a portion of a first payload of the datagram that is allocated for use of a slave device, and receive a first coexistence management message from the slave device in the portion of the first payload of the datagram that is allocated for use of the slave device.

The processor-readable storage medium 1918 may include instructions that cause the processing circuit 1902 to configure the slave device with a number of clock pulses that identifies the portion of the first payload of the datagram that is allocated for use of the slave device.

The processor-readable storage medium 1918 may include instructions that cause the processing circuit 1902 to receive an acknowledge bit from the slave device after completion of the first payload of the datagram, and to provide a second payload in the datagram as a response to the acknowledge bit. The processor-readable storage medium 1918 may include instructions that cause the processing circuit 1902 to cause the first line driver to weakly drive the data line during a portion of the second payload of the datagram allocated for use of the slave device, and receive a second coexistence management message from the slave device in the portion of the second payload of the datagram that is allocated for use of the slave device.

The processor-readable storage medium 1918 may include instructions that cause the processing circuit 1902 to idle the serial bus by causing the first line driver to weakly drive the data line to a first state, and by causing a second line driver to suppress pulses in a clock line of the serial bus. The processor-readable storage medium 1918 may include instructions that cause the processing circuit 1902 to detect that the data line has been driven to the second state indicating initiation of a sequence start condition after the serial bus is idled, completing the sequence start condition by driving the data line to the first state, and transmit the datagram after completing the sequence start condition. The instructions may cause the processing circuit 1902 to initially drive the data line to the second state after transitioning its line driver from idle to active mode and before driving the data line to the first state.

The first coexistence management message may be addressed to a bus master device or to a slave device using an address field in the first coexistence management message. The first coexistence management message may be addressed to a component in the bus master device or in the slave device using a virtual address field in the first coexistence management message.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications at a slave device, comprising:
   determining that a destination address received at the slave device from a datagram being transmitted over a serial bus corresponds to a coexistence management identifier;
   activating a line driver coupled to a data line of the serial bus while the datagram is being transmitted over the serial bus and during a first portion of a first payload of the datagram when one or more coexistence management messages are ready for sending from the slave device, wherein the first portion of the first payload of the datagram is allocated to be populated by the slave device; and
   populating the first portion of the first payload of the datagram by transmitting a first coexistence management message of the one or more coexistence management messages through the line driver,
   wherein a second portion of the first payload of the datagram is allocated to be populated by another slave device.

2. The method of claim 1, further comprising:
   locating the first portion of the first payload of the datagram at the slave device by counting clock pulses on a clock line of the serial bus.

3. The method of claim 2, wherein the first portion of the first payload of the datagram commences after a number of clock pulses calculated as a multiple of a unique identifier of the slave device.

4. The method of claim 2, wherein the first portion of the first payload of the datagram commences after a number of clock pulses configured by a bus master.

5. The method of claim 1, further comprising:
   activating the line driver coupled to the data line of the serial bus while the datagram is being transmitted over the serial bus and during a first portion of a second payload of the datagram, the first portion of the second payload of the datagram being allocated to be populated by the slave device; and
   populating the first portion of the second payload of the datagram by transmitting a second coexistence management message of the one or more coexistence management messages through the line driver.

6. The method of claim 5, further comprising:
   determining that the second coexistence management message is ready for sending from the slave device after completion of the first payload of the datagram; and
   requesting a bus master to provide the second payload by driving an acknowledge bit provided after the first payload of the datagram when the second coexistence management message is ready for sending.

7. The method of claim 1, further comprising:
   refraining from transmitting data in one or more additional payloads of the datagram when no further coexistence management messages are ready for sending from the slave device.

8. The method of claim 1, further comprising:
   driving the data line to initiate a sequence start condition when the serial bus is idle and when the one or more coexistence management messages are ready for sending from the slave device; and
   receiving the datagram from the serial bus after a bus master completes transmission of the sequence start condition.

9. The method of claim 1, wherein transmitting the first coexistence management message comprises:
   addressing the first coexistence management message to a bus master or to a different slave device using an address field in the first coexistence management message.

10. The method of claim 9, wherein transmitting the first coexistence management message comprises:
    addressing the first coexistence management message to a component of the bus master or of the different slave device using a virtual address field in the first coexistence management message.

11. A slave device comprising:
    a bus interface circuit configured to couple the slave device to a serial bus; and
    a controller configured to:
        determine that a destination address received from a datagram being transmitted over the serial bus corresponds to a coexistence management identifier;
        activate a line driver of the bus interface circuit that is coupled to a data line of the serial bus while the datagram is being transmitted over the serial bus and during a first portion of a first payload of the datagram when one or more coexistence management messages are ready for sending from the slave device, wherein the first portion of the first payload of the datagram is allocated to be populated by the slave device; and
        populate the first portion of the first payload of the datagram by transmitting a first coexistence management message of the one or more coexistence management messages through the line driver,
wherein a second portion of the first payload of the datagram is allocated to be populated by another slave device.

12. The slave device of claim 11, wherein the controller is further configured to:
locate the first portion of the first payload of the datagram at the slave device by counting clock pulses on a clock line of the serial bus, wherein the first portion of the first payload of the datagram commences after a number of clock pulses configured by a bus master or calculated as a multiple of a unique identifier of the slave device.

13. The slave device of claim 11, wherein the controller is further configured to:
activate the line driver coupled to the data line of the serial bus while the datagram is being transmitted over the serial bus and during a first portion of a second payload of the datagram, the first portion of the second payload of the datagram being allocated to be populated by the slave device;
populate the first portion of the second payload of the datagram by transmitting a second coexistence management message of the one or more coexistence management messages through the line driver;
determine that the second coexistence management message is ready for sending from the slave device after completion of the first payload of the datagram; and
request a bus master to provide the second payload by driving an acknowledge bit provided after the first payload of the datagram when the second coexistence management message is ready for sending.

14. The slave device of claim 11, wherein the controller is further configured to:
drive the data line to initiate a sequence start condition when the serial bus is idle and when the one or more coexistence management messages are ready for sending from the slave device; and
receive the datagram from the serial bus after a bus master completes transmission of the sequence start condition.

15. The slave device of claim 11, wherein the controller is further configured to:
address the first coexistence management message to a bus master or to a different slave device using an address field in the first coexistence management message.

16. The slave device of claim 15, wherein the controller is further configured to:
address the first coexistence management message to a component of the bus master or of the different slave device using a virtual address field in the first coexistence management message.

17. A method of data communications at a bus master device, comprising:
initiating transmission of a datagram over a serial bus directed to a register address corresponding to a coexistence management identifier;
causing a first line driver to refrain from driving a data line of the serial bus during a first portion of a first payload of the datagram that is allocated to be populated by a first slave device; and
receiving a first coexistence management message from the first slave device in the first portion of the first payload of the datagram,
wherein a second portion of the first payload of the datagram is allocated to be populated by another slave device.

18. The method of claim 17, further comprising:
configuring the first slave device with a number of clock pulses that identifies the first portion of the first payload of the datagram.

19. The method of claim 17, further comprising:
receiving an acknowledge bit from the first slave device after completion of the first payload of the datagram; and
initiating transmission of a second payload in the datagram as a response to the acknowledge bit.

20. The method of claim 19, further comprising:
causing the first line driver to refrain from driving the data line during a first portion of the second payload of the datagram that is allocated to be populated by the first slave device; and
receiving a second coexistence management message from the first slave device in the first portion of the second payload of the datagram.

21. The method of claim 17, further comprising:
idling the serial bus, including:
causing the first line driver to drive the data line to a first state; and
causing a second line driver to suppress pulses in a clock line of the serial bus;
detecting that the data line has been driven to a second state indicating initiation of a sequence start condition after the serial bus is idled;
completing the sequence start condition by driving the data line to the first state; and
transmitting the datagram after completing the sequence start condition.

22. The method of claim 17, wherein the first coexistence management message is addressed to the bus master device or to a different slave device using an address field in the first coexistence management message.

23. The method of claim 22, wherein the first coexistence management message is addressed to a component in the bus master device or in the different slave device using a virtual address field in the first coexistence management message.

24. A data communication apparatus comprising:
a bus interface circuit configured to couple the data communication apparatus to a serial bus; and
a controller configured to:
initiate transmission of a datagram over the serial bus directed to a register address corresponding to a coexistence management identifier;
cause a first line driver to refrain from driving a data line of the serial bus during a first portion of a first payload of the datagram that is allocated to be populated by a first slave device; and
receive a first coexistence management message from the first slave device in the first portion of the first payload of the datagram,
wherein a second portion of the first payload of the datagram is allocated to be populated by another slave device.

25. The data communication apparatus of claim 24, wherein the controller is further configured to:
configure the first slave device with a number of clock pulses that identifies the first portion of the first payload of the datagram.

26. The data communication apparatus of claim 24, wherein the controller is further configured to:

receive an acknowledge bit from the first slave device after completion of the first payload of the datagram; and initiate transmission of a second payload in the datagram as a response to the acknowledge bit.

27. The data communication apparatus of claim 26, wherein the controller is further configured to:

cause the first line driver to refrain from driving the data line during a first portion of the second payload of the datagram that is allocated to be populated by the first slave device; and receive a second coexistence management message from the first slave device in the first portion of the second payload of the datagram.

28. The data communication apparatus of claim 24, wherein the controller is further configured to:

idle the serial bus by:

causing the first line driver to drive the data line to a first state; and causing a second line driver to suppress pulses in a clock line of the serial bus;

detect that the data line has been driven to a second state indicating initiation of a sequence start condition after the serial bus is idled;

complete the sequence start condition by driving the data line to the first state; and transmit the datagram after completing the sequence start condition.

29. The data communication apparatus of claim 24, wherein the first coexistence management message is addressed to the data communication apparatus or to a different slave device using an address field in the first coexistence management message.

30. The data communication apparatus of claim 29, wherein the first coexistence management message is addressed to a component in the data communication apparatus or in the different slave device using a virtual address field in the first coexistence management message.

\* \* \* \* \*